US 011812404B2

(12) United States Patent
Bao et al.

(10) Patent No.: US 11,812,404 B2
(45) Date of Patent: Nov. 7, 2023

(54) REFERENCE CARRIER PHASE FOR POSITIONING REFERENCE SIGNALS

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 301 days.

(21) Appl. No.: 17/401,266

(22) Filed: Aug. 12, 2021

(65) Prior Publication Data

US 2023/0046045 A1 Feb. 16, 2023

(51) Int. Cl.
*H04W 64/00* (2009.01)
*H04L 5/00* (2006.01)
*H04W 72/0446* (2023.01)

(52) U.S. Cl.
CPC ......... *H04W 64/006* (2013.01); *H04L 5/0048* (2013.01); *H04W 72/0446* (2013.01)

(58) Field of Classification Search
CPC ... H04W 64/00; H04W 64/006; H04W 72/04; H04W 72/044; H04W 72/0446; H04W 72/0453; H04L 5/0048; H04L 5/005; H04L 5/0094
See application file for complete search history.

(56) References Cited

U.S. PATENT DOCUMENTS

| 7,911,378 | B2 | 3/2011 | Zhang et al. |
| 9,606,215 | B2 | 3/2017 | Marshall et al. |
| 10,890,665 | B2 | 1/2021 | Modarres Razavi et al. |
| 2020/0212990 | A1 | 7/2020 | Kurras et al. |
| 2020/0408871 | A1* | 12/2020 | Da ........................ H04L 5/0053 |
| 2022/0321293 | A1* | 10/2022 | Ren ........................ H04W 72/20 |
| 2023/0180040 | A1* | 6/2023 | Ren ........................ H04L 5/005 370/252 |
| 2023/0180172 | A1* | 6/2023 | Zhang ..................... H04W 4/02 455/456.1 |

FOREIGN PATENT DOCUMENTS

WO 2011042728 A1 4/2011

OTHER PUBLICATIONS

CATT: "Discussion of NR Positioning Enhancements", 3GPP TSG RAN WG1 Meeting #101, R1-2003642, 3rd Generation Partnership Project (3GPP), Mobile Competence Centre, 650, Route Des Lucioles, F-06921 Sophia-Antipolis Cedex, France, vol. RAN WG1, No. e-meeting, May 25, 2020-Jun. 5, 2020, 18 Pages, May 16, 2020 (May 16, 2020), XP051885417, Sections 3.1.1, 3.1.3, Figures 5, 6.
International Search Report and Written Opinion—PCT/US2022/037966—ISA/EPO—dated Nov. 18, 2022.

* cited by examiner

*Primary Examiner* — Siu M Lee
(74) *Attorney, Agent, or Firm* — Sunstein LLP

(57) ABSTRACT

A method of providing positioning reference signal information includes: transmitting wirelessly, from an apparatus, a positioning reference signal comprising a carrier signal with a carrier phase; and transmitting, from the apparatus, an indication of a reference carrier phase of the positioning reference signal, comprising a phase of the carrier signal of the positioning reference signal at a reference time of transmission of the positioning reference signal.

38 Claims, 15 Drawing Sheets

1200

| TRP ID | PRS resource set ID | PRS resource ID | Occasion | Initial carrier phase (degrees) |
|---|---|---|---|---|
| TRP1 | Set ID11 | Res ID111 | Occ1 | 237 |
|  |  | Res ID111 | Occ2 | 164 |
|  |  | Res ID112 | Occ1 | 87 |
|  |  | Res ID112 | Occ2 | 301 |
|  | Set ID11 | Res ID121 | Occ1 | 100 |
|  |  | Res ID122 | Occ1 | 140 |
| TRP2 | Set ID21 | Res ID211 | Occ3 | 130 |
|  |  | Res ID212 | Occ3 | 110 |

| TRP ID | PRS resource set ID | PRS resource ID | Occasion | Initial carrier phase (degrees) |
|---|---|---|---|---|
| TRP1 | Set ID11 | Res ID111 | Occ1 | 237 |
|  |  | Res ID111 | Occ2 | -73 |
|  |  | Res ID112 | Occ1 | -150 |
|  |  | Res ID112 | Occ2 | 64 |
|  | Set ID11 | Res ID121 | Occ1 | 100 |
|  |  | Res ID122 | Occ1 | 40 |
| TRP2 | Set ID21 | Res ID211 | Occ3 | 130 |
|  |  | Res ID212 | Occ3 | -20 |

REFERENCE CARRIER PHASE FOR POSITIONING REFERENCE SIGNALS

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

In an embodiment, an apparatus includes: a transmitter; a memory; and a processor communicatively coupled to the transmitter and the memory and configured to: transmit, wirelessly via the transmitter, a positioning reference signal comprising a carrier signal with a carrier phase; and transmit, via the transmitter, an indication of a reference carrier phase of the positioning reference signal, comprising a phase of the carrier signal of the positioning reference signal at a reference time of transmission of the positioning reference signal.

In an embodiment, a method of providing positioning reference signal information includes: transmitting wirelessly, from an apparatus, a positioning reference signal comprising a carrier signal with a carrier phase; and transmitting, from the apparatus, an indication of a reference carrier phase of the positioning reference signal, comprising a phase of the carrier signal of the positioning reference signal at a reference time of transmission of the positioning reference signal.

In an embodiment, a device includes: a transceiver; a memory; and a processor communicatively coupled to the transceiver and the memory and configured to: obtain a first carrier phase indication, corresponding to a positioning reference signal receiver, indicating a first measured carrier phase of a positioning reference signal; transmit, via the transceiver, the first carrier phase indication; and at least one of: transmit, via the transceiver, a second carrier phase indication indicating whether the first carrier phase indication includes a reference carrier phase of the positioning reference signal, comprising a phase of a carrier signal of the positioning reference signal at a reference time of transmission of the positioning reference signal; or transmit, via the transceiver, a third carrier phase indication indicating a second measured carrier phase of the positioning reference signal such that one of the first measured carrier phase and the second measured carrier phase includes the reference carrier phase of the positioning reference signal and another one of the first measured carrier phase and the second measured carrier phase excludes a phase value corresponding to the reference carrier phase of the positioning reference signal.

In an embodiment, a method of providing carrier phase information includes: obtaining, at a first device, a first carrier phase indication, corresponding to a positioning reference signal receiver, indicating a first measured carrier phase of a positioning reference signal; transmitting, to a second device, the first carrier phase indication; and at least one of: transmitting, to the second device, a second carrier phase indication indicating whether the first carrier phase indication includes a reference carrier phase of the positioning reference signal, comprising a phase of a carrier signal of the positioning reference signal at a reference time of transmission of the positioning reference signal; or transmitting, to the second device, a third carrier phase indication indicating a second measured carrier phase of the positioning reference signal such that one of the first measured carrier phase and the second measured carrier phase includes the reference carrier phase of the positioning reference signal and another one of the first measured carrier phase and the second measured carrier phase excludes a phase value corresponding to the reference carrier phase of the positioning reference signal.

BRIEF DESCRIPTION OF THE DRAWINGS

FIG. 12 is an example initial carrier phase value message indicating absolute carrier phase values.

FIG. 13 is another example initial carrier phase value message indicating absolute and relative carrier phase values.

DETAILED DESCRIPTION

Figure 1:
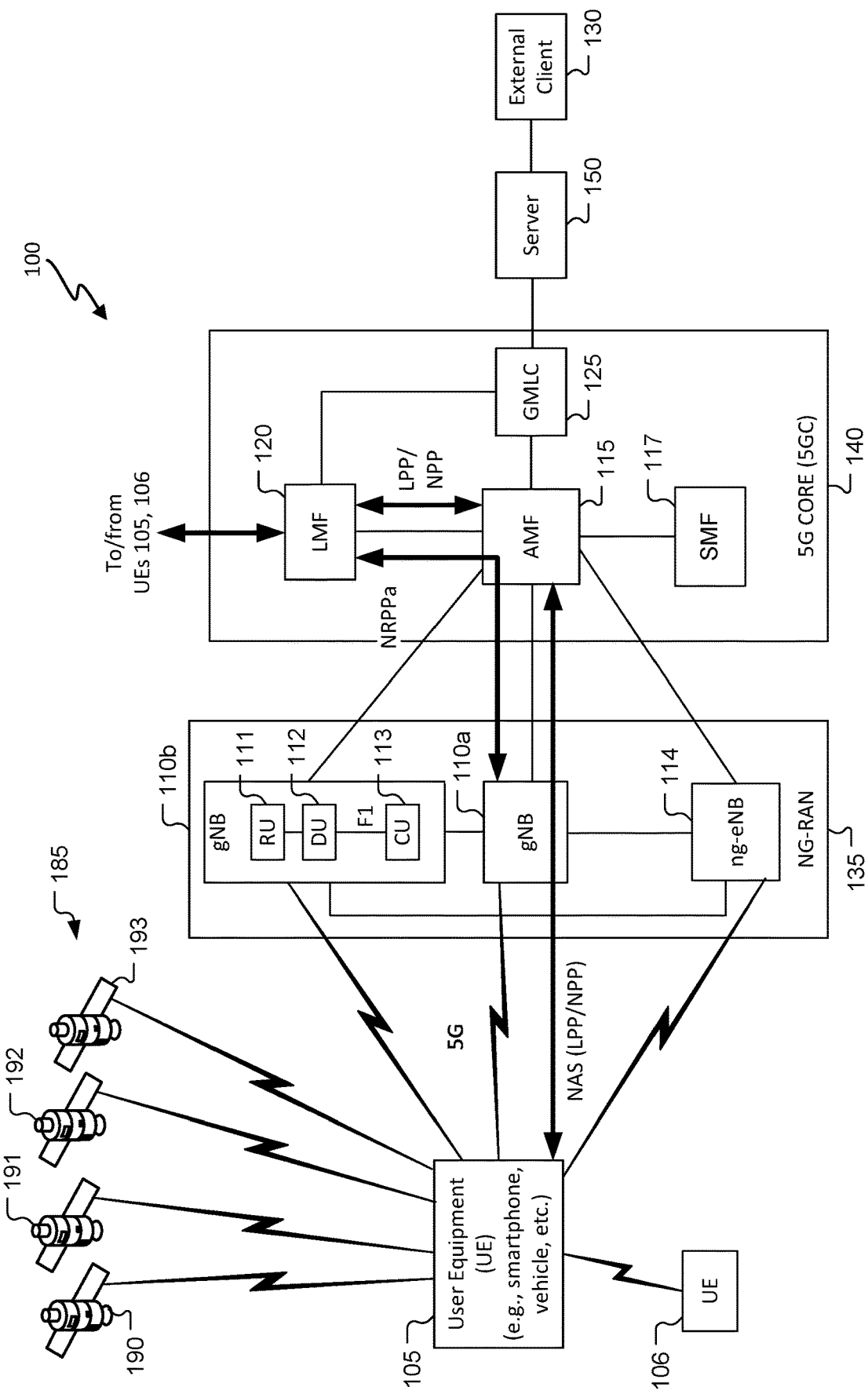
FIG. 1 is a simplified diagram of an example wireless communications system.

Techniques are discussed herein for performing carrier-phase-based positioning using terrestrial-based positioning signals. For example, a base station transmits different positioning reference signal (PRS) bursts to a target device (e.g., a target user equipment (UE)) and to a reference device. The base station also transmits an indication of a reference carrier signal phase (e.g., an initial carrier signal phase) of the PRS burst, e.g., the phase of the carrier signal at a reference point such as the beginning of a slot, or subframe, or frame at the transmitter of the PRS. The base station may send the indication of the reference phase to a positioning entity (e.g., in a location server, the target device, etc.). The base station may, for example, determine the reference phase upon transmission of the PRS burst and send an indication of this determined reference phase to the target device and/or other entity(ies). As another example, the base station may predict the reference phase and send an indication of the predicted reference phase to the target device and/or other entity(ies). As another example, the base station may control the reference phase and send an indication of the controlled reference phase to the target device and/or other entity(ies). The target device and a reference device measure the PRS burst and provide indications of PRS measurements to the positioning entity. The positioning entity may use measurements for the target device corresponding to one or more PRS transmitters and/or one or more reference devices to determine position information (e.g., a location estimate) for the target device. Other configurations, however, may be used.

Items and/or techniques described herein may provide one or more of the following capabilities, as well as other capabilities not mentioned. High-accuracy positioning may be achieved using terrestrial-based positioning reference signals. Carrier-phase based positioning may be implemented using terrestrial-based positioning reference signals. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 containing a satellite vehicle (SV) 190, an SV 191, an SV 192, and an SV 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110a includes an RU 111, a DU 112, and a CU 113. The RU 111, DU 112, and CU 113 divide functionality of the gNB 110a. While the gNB 110a is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110a. The DU 112 hosts the Radio Link Control (RLC), Medium Access Control (MAC), and physical layers of the gNB 110a. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110a. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
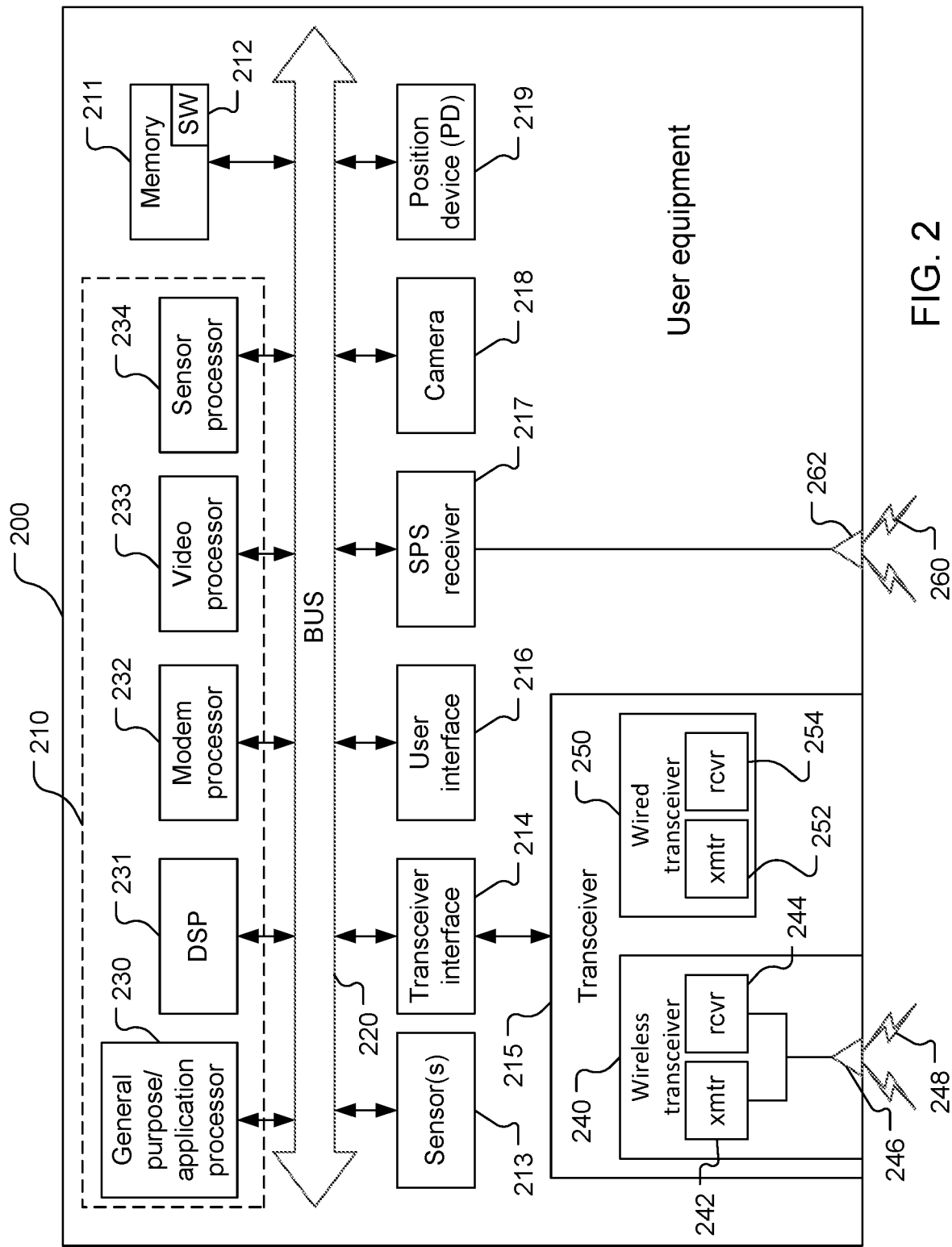
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
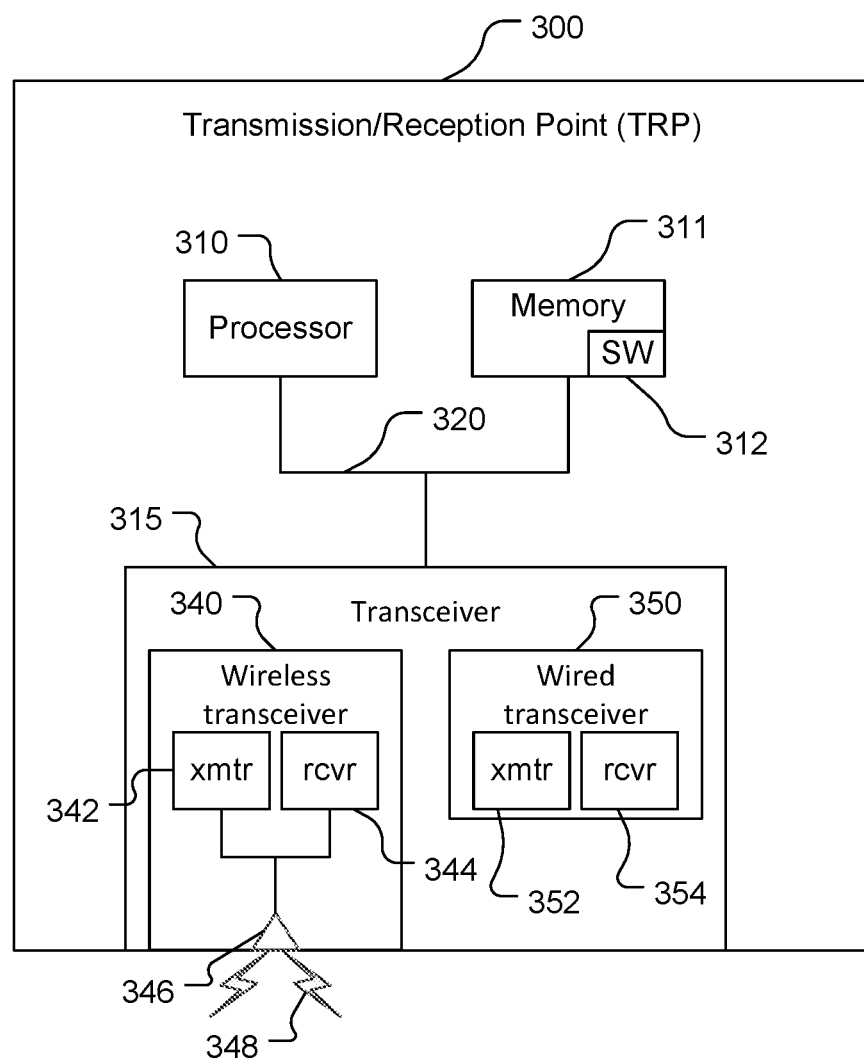
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
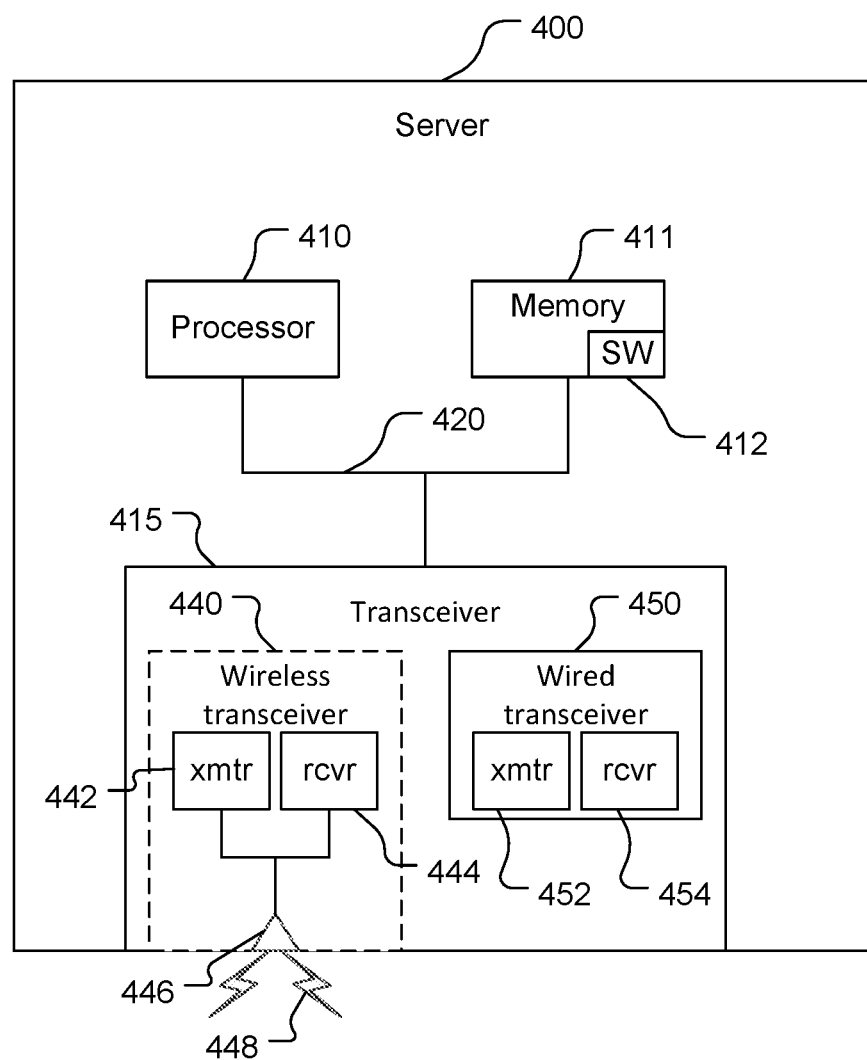
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., a location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message (s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may be generated using a PN code (pseudorandom number code) (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Carrier-Phase-Based Positioning

Figure 5:
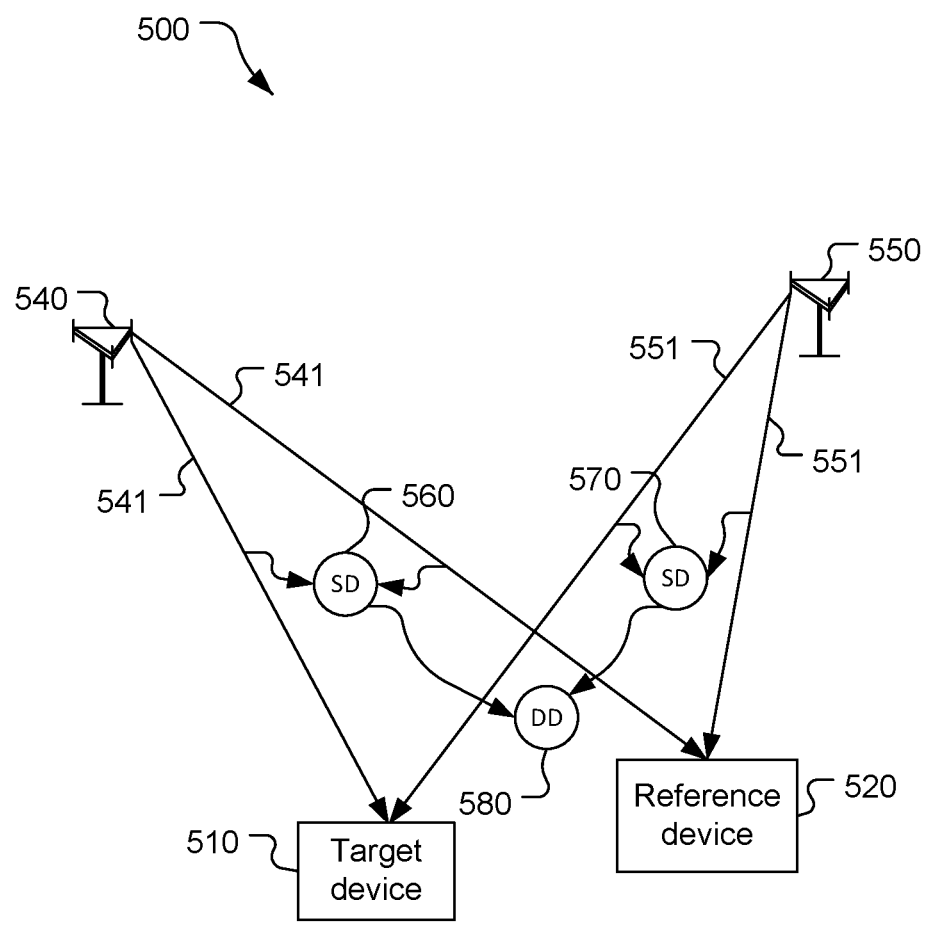
FIG. 5 is a simplified diagram of a terrestrial-based positioning system.

Referring also to FIG. 5, a terrestrial-based positioning system 500 using PRS carrier phase measurements includes a target device 510, a reference device 520, a positioning entity 530, a base station 540, and a base station 550. The bases stations 540, 550 transmit respective PRS 541, 551 to the target device 510 and to the reference device 520, with the PRS 541, 551 including PN (pseudorandom noise) codes carried by a carrier signal having a carrier phase. The PN codes may be correlated to obtain code phase measurements (from which pseudorange measurements can be determined) and the carrier phase may be measured to determine carrier phase measurements. Using carrier phase measurements in addition to the pseudorange measurements, positioning accuracy for the target device 510 with about 0.01 m to about 0.1 m accuracy may be achieved. Measurement error for code phase measurements may be about 0.3 m to about 3.0 m while carrier phase measurement error may be about 0.002 m. The reference device 520 is used to measure the signals 541, 551 in addition to the target device 510 in order to eliminate or mitigate errors such as base station clock errors in the measurements. The target device 510 may be, for example a UE, but other forms of target devices may be used. The reference device 520 may be, for example, a UE or a TRP, but other forms of reference devices may be used.

For carrier-phase-based positioning, a range (distance) from a source of a carrier signal to a receiver of the carrier signal is determined as the total carrier phase (the number of cycles, including a partial cycle (if any)) between the source and receiver multiplied by the wavelength, λ, of the carrier signal. The total carrier phase can be represented as an integer number N of full cycles between the source and receiver plus a fractional carrier phase θ divided by 2π. The fractional carrier phase θ is given by $$\theta = \theta(t) - \theta_0 \quad (1)$$

where $\theta_0$ is the initial carrier phase at the transmitter (carrier signal source) and θ(t) is the carrier phase measured at the receiver. While the initial phase is shown in Equation (1), and discussed herein as an example, any reference phase may be used, with the measured carrier phase being relative to the reference phase. Thus, the range ρ may be given by $$\rho = \left(N + \frac{\theta(t) - \theta_0}{2\pi}\right) * \lambda \quad (2)$$

In the system 500, the base stations 540, 550 (as shown, for example, TRPs) broadcast the PRS 541, 551 in bursts over time and the target device 510 and the reference device 520 will measure the PRS 541, 551. The initial carrier phase of the PRS 541, 551 is the carrier phase at the time of transmission of the first symbol of the PRS 541, 551 at the base stations 540, 541, respectively. A reference carrier phase other than the initial carrier phase, e.g., the beginning of a slot, subframe, or frame, may be used. If the same PRS resource in the same PRS occasion of the PRS 541 is measured by both the target device 510 and the reference device 520, and the same PRS resource in the same PRS occasion of the PRS 551 is measured by both the target device 510 and the reference device 520, then the need to know the initial phase $\theta_0$ can be eliminated by using measurements from both the target device 510 and the reference device 520 in a double delta scheme as discussed further below. Raw carrier phase measurements may be provided by the target device 510 and the reference device 520 to the positioning entity 530 and the positioning entity can process the carrier phase measurements to determine the distance between the target device 510 and each of the base stations 540, 550. In particular, one or more RSTD measurements may be provided from which range between source (e.g., the base stations 540, 550) and receiver (e.g., the target device 510) may be determined. The positioning entity 530 may be separate from the target device 510 and the reference device 520 as shown, or may be included in the target device 510 and/or the reference device 520 (e.g., a TRP). For example, the positioning entity 530 may be implemented by the processor 310 and the memory 311, by the processor 410 and the memory 411, and/or by one or more other processors and corresponding memory (e.g., of the target device 510).

With the same PRS resource of the same PRS occasion in each of the PRS 541, 551, respectively, measured, a pseudorange pr and a carrier phase distance co between a receiver (the target device 510 or the reference device 520) and source (the base station 540 or the base station 550) based on code phase measurement may be given by $$pr = \rho + d\rho + c(dt - dT) + \varepsilon_p \quad (3)$$

$$\varphi = \lambda\left(\frac{\theta(t) - \theta_0}{2\pi}\right) = \rho + d\rho + c(dt - dT) + \varepsilon_\varphi - \lambda N \quad (4)$$

where ρ is the range between transmitter (e.g., base station) and receiver (e.g., the target device 510 and the reference device 520, respectively), c is the speed of light, λ is the carrier signal wavelength, N is the carrier phase integer ambiguity (cycle), dρ is transmitter range error (e.g., base station location error), dt is transmitter clock error, dT is receiver clock error, $\varepsilon_p$ is pseudorange noise and multipath, and $\varepsilon_\varphi$ carrier phase noise and multipath. Atmospheric propagation errors are not shown in Equations (3) and (4) for simplicity because these errors may be ignored for terrestrial-based positioning. A single difference (SD) between receivers may be determined. Differences between pseudoranges and carrier phase distances for the PRS 541 from the base station 540 to the target device 510 and to the reference device 520 may be determined according to $$\Delta pr = \Delta\rho + \Delta d\rho - c\Delta dT + \varepsilon_{\Delta p} \quad (5)$$

$$\Delta\varphi = \Delta\rho + \Delta d\rho + c\Delta dT - \lambda\Delta N + \varepsilon_{\Delta\varphi} \quad (6)$$

By subtracting a measurement by the reference device 520 from a measurement by the target device 510, transmitter clock error dt may be eliminated, transmitter range error dρ may be eliminated with accurate knowledge of the locations the target device 510 and the reference device 520, and the initial phase may be eliminated from consideration if the same initial phase is used (due to measuring the same PRS resource of the same PRS occasion) because $$\Delta\varphi = \varphi_{UE}^1 - \varphi_{Ref}^1 = \varphi_{UE}^1 - \phi_0 - (\varphi_{Ref}^1(t) - \phi_0) = \varphi_{UE}^1(t) - \varphi_{Ref}^1(t) \quad (7)$$

where $\varphi_{UE}^1$ is the carrier phase from a first transmitter, e.g., the base station 540, to the target device 510 and $\varphi_{Ref}^1$ is the carrier phase from the first transmitter to the reference device 520. Further, single differences between transmitters (e.g., the base station 540 and the base station 550) may be determined as represented by $$\nabla pr = \nabla\rho + \nabla d\rho + c\nabla dt + \varepsilon_{\nabla p} \quad (8)$$

$$\nabla\varphi = \nabla\rho + \nabla d\rho + c\nabla dt - \lambda\Delta N + \varepsilon_{\nabla\varphi} \quad (9)$$

By subtracting measurements made by the same receiver of signals from different transmitters, receiver clock error dT and common hardware bias in the receiver may be eliminated.

A double delta scheme may be applied to signal measurements of the terrestrial-based positioning system 500. The double delta scheme uses differences of transmitter measurements and differences of receiver measurements to determine position information for the target device 510. Double differences of pseudorange and carrier phase distance may be determined according to $$\nabla\Delta pr = \nabla\Delta\rho + \nabla\Delta d\rho + \varepsilon_{\nabla\Delta p} \quad (10)$$

$$\nabla\Delta\varphi = \nabla\Delta\rho + \nabla\Delta d\rho - \lambda\nabla\Delta N + \varepsilon_{\nabla\Delta\varphi} \quad (11)$$

The double difference (DD) operation determines a first difference (indicated by an SD indicator 560) between measurements of the same signal received at the target device 510 and the reference device 520 from a first terrestrial-based transmitter, here a signal 541 from a first base station 540, determines a second difference (indicated by an SD indicator 570) between measurements of the same signal received at the target device 510 and the reference device 520 from a second terrestrial-based transmitter, here a signal 551 from a second base station 550, and determines a third difference (indicated by a DD indicator 580) between the first difference and the second difference. By determining the double difference, transmitter clock error dt and receiver clock error dT can be eliminated, and the transmitter range error dρ may be reduced. Further, Equations (10) and (11) may be simplified by removing the $\nabla\Delta d\rho$ term corresponding to transmitter range error if the locations of the first base station 540 and the second base station 550 are known with high accuracy. Consequently, Equations (10) and (11) are simplified to $$\nabla\Delta pr = \nabla\Delta\rho + \varepsilon_{\nabla\Delta p} \quad (12)$$

$$\nabla\Delta\varphi = \nabla\Delta\rho - \lambda\nabla\Delta N + \varepsilon_{\nabla\Delta\varphi} \quad (13)$$

The $\lambda\nabla\Delta N$ term may be estimated using any known integer ambiguity resolver (IAR) technique. For example, with measurements of $\nabla\Delta\varphi$ and $\nabla\Delta pr$ and knowledge of rough location of the receiver, an initial estimation of N may be made, and an IAR technique may use the initial estimation and/or measurements of $\nabla\Delta\varphi$ and $\nabla\Delta pr$ to resolve the V∂N ambiguity. The measurement of $\nabla\Delta\varphi$ may be used if initial phases of the signals used to determine the double difference is irrelevant, e.g., the same due to measurement of the same PRS resource of the same PRS occasion, or if the initial phases are otherwise known, even if different. The signals 541,551 transmitted by the base stations 540, 550 may be burst RF reference signals, with multiple transmissions of each signal that are separated in time and/or frequency. For example, the signals 541, 551 may be PRS with multiple PRS resources being transmitted within a PRS occasion (e.g., PRS resource repetitions and/or different PRS resources), and/or multiple PRS resources being transmitted across PRS occasions. Different PRS transmissions may not have phase coherency. If the exact same PRS resource (same PRS resource in same PRS occasion) is received by both the target device 510 and the reference device 520, then the initial phase $\theta_0$ is the same for the measurements by the target device 510 and the reference device 520, and thus can be eliminated by the double difference scheme discussed above. If the target device 510 and the reference device 520 measure the carrier phase using different PRS resources (e.g., the same PRS resource in different repetitions, the same PRS resource in different occasions, or PRS resources of different subcarriers) then the initial phase $\theta_0$ will typically be different for the target device 510 and the reference device 520. The double difference scheme will thus not eliminate the initial phase, but the double difference phase measurement at the target device 510 can be determined if the initial phases for the PRS resources measured by the target device 510 and the reference device 520 are otherwise known, e.g., provided by the base stations 540, 550. That is, the $\nabla\Delta\varphi$ term can be determined from carrier phase measurements of signals from the first base station 540 and the second base station 550 by the target device 510 and the reference device 520 with knowledge of the initial phase 90 of each of the transmitted signals, using $$\varphi = \left(\frac{\theta(t) - \theta_0}{2\pi}\right) * \lambda \quad (13)$$

where θ(t) is the measured carrier phase at time t. Further, for TDOA-based positioning, the $\nabla\Delta\rho$ term and knowledge of locations of the reference device 520, the first base station 540, and the second base station 550 can be used to determine an RSTD at the target device 510 according to $$\nabla\Delta\rho + \text{true\_RSTD}_{ij}^{ref} = \text{mes\_RSTD}_{ij}^{UE} - \text{mes\_RSTD}_{ij}^{ref} + \text{true\_RSTD}_{ij}^{ref} \quad (14)$$

$$= \text{true\_RSTD}_{ij}^{UE} + n \quad (15)$$

where true_RSTD$_{ij}^{ref}$ is the true (actual) RSTD at the reference device 520 of the signals 541, 551, mes_RSTD$_{ij}^{UE}$ is the measured RSTD at the target device 510 of the signals 541, 551, and mes_RSTD$_{ij}^{ref}$ is the measured RSTD at the reference device 520 of the signals 541, 551. The true RSTD at the target device 510 is a very accurate RSTD, which can be used to determine an accurate range to the target device 510 from the first base station 540, and multiple such ranges can be used to determine the position of the target device 510 with a high degree of accuracy.

Referring again to FIG. 3, the description herein may refer only to the processor 310 performing a function, but this includes other implementations such as where the processor 310 executes software (stored in the memory 311) and/or firmware. The description herein may refer to the TRP 300 performing a function as shorthand for one or more appropriate components (e.g., the processor 310 and the memory 311) of the TRP 300 performing the function.

Figure 6:
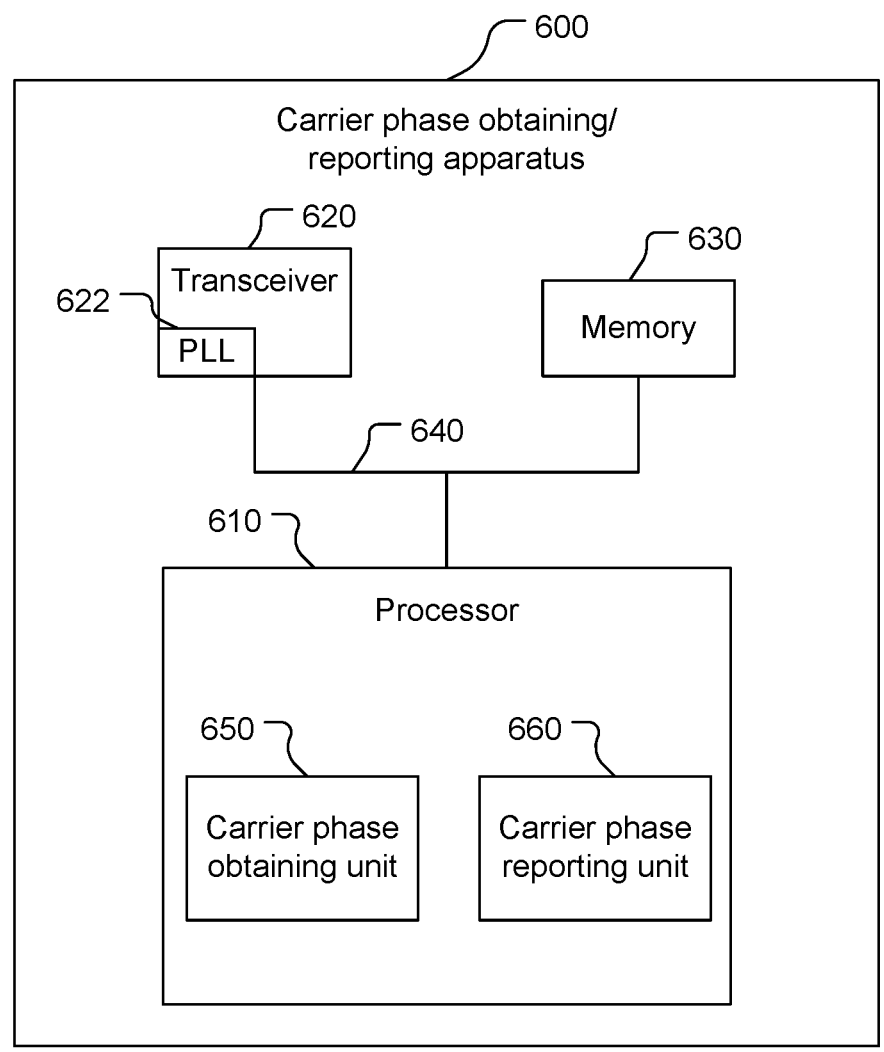
FIG. 6 is a simplified block diagram of an example apparatus for carrier phase obtaining and reporting.

Referring to FIG. 6, with further reference to FIG. 2, an apparatus 600 for obtaining and possibly reporting carrier phase measurements includes a processor 610, a transceiver 620, and a memory 630 communicatively coupled to each other by a bus 640. The apparatus 600 may include some or all of the components shown in FIG. 6, and may include one or more other components such as any of those shown in FIG. 2 such that the UE 200 may be an example of the apparatus 600. The target device 510 and the reference device 520 may each be an example of the apparatus 600. The processor 610 may include one or more components of the processor 210. The transceiver 620 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 620 may include the wired transmitter 252 and/or the wired receiver 254. The transceiver 620 may include the SPS receiver 217 and the antenna 262. The transceiver 620 includes a PLL 622 (phase locked loop) configured to track the phase of an incoming signal received by the transceiver 620. The memory 630 may be configured similarly to the memory 211, e.g., including software with processor-readable instructions configured to cause the processor 610 to perform functions. Alternatively, the apparatus may be a TRP or another device, or a part of a TRP or another device, e.g., with the transceiver 620 being configured similarly to the transceiver 315.

The description herein may refer only to the processor 610 performing a function, but this includes other implementations such as where the processor 610 executes software (stored in the memory 630) and/or firmware. The description herein may refer to the apparatus 600 performing a function as shorthand for one or more appropriate components (e.g., the processor 610 and the memory 630) of the apparatus 600 performing the function. The processor 610 (possibly in conjunction with the memory 630 and, as appropriate, the transceiver 620) includes a carrier phase obtaining unit 650 and may include a carrier phase reporting unit 660. The carrier phase obtaining unit 650 may be configured to obtain measurements of carrier phase of PRS (e.g., determine measurements of PRS received by the apparatus 600 and/or receive measurements of PRS from other entities). The measurements may include or exclude an initial phase value of the carrier phase of the PRS. Also or alternatively, the carrier phase obtaining unit 650 may be configured to obtain (e.g., receive) one or more indications of initial carrier phase of PRS. Thus, the apparatus 600 may obtain initial carrier phase indications without obtaining carrier phase measurements. The carrier phase reporting unit 660 may be configured to report one or more measurements of carrier phase such that a recipient of the carrier phase measurement(s) can discern whether the carrier phase measurement(s) include the initial carrier phase. Also or alternatively, the carrier phase reporting unit 660 may be configured to report one or more indications of initial carrier phase. Functionality of the carrier phase obtaining unit 650 and the carrier phase reporting unit 660 is discussed further herein, and the description may refer to the processor 610 generally, or the apparatus 600 generally, as performing any of the functions of the carrier phase obtaining unit 650 or the carrier phase reporting unit 660.

Figure 7:
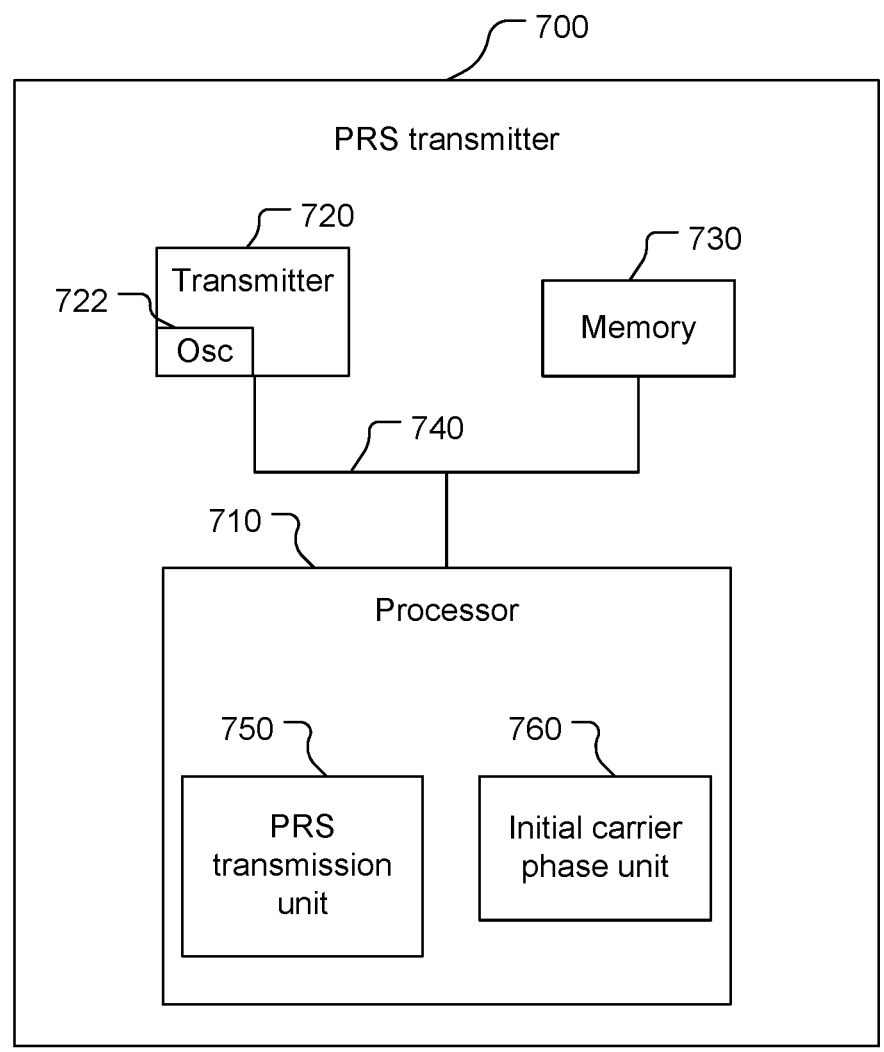
FIG. 7 is a simplified block diagram of a positioning reference signal transmitter.

Referring to FIG. 7, with further reference to FIGS. 3-5, a PRS transmitter 700 includes a processor 710, a transmitter 720, and a memory 730 communicatively coupled to each other by a bus 740. The PRS transmitter 700 is an apparatus configured to transmit PRS and to transmit indications of initial carrier phases of PRS transmissions from the PRS transmitter 700. The PRS transmitter 700 may be, for example, a UE that transmits SL-PRS or UL-PRS, or a TRP (e.g., the first base station 540 or the second base station 550) that transmits DL-PRS, or another device, or a portion of a UE or a TRP or another device. The PRS transmitter may include one or more further components such as a receiver (e.g., a wireless receiver and/or a wired receiver such as shown in FIG. 2 and/or FIG. 3). The transmitter 720 includes a wireless transmitter and an antenna (e.g., the wireless transmitter 242 and the antenna 246, or the wireless transmitter 342 and the antenna 346) and may include a wired transmitter (e.g., the wired transmitter 252 and/or the wired transmitter 352). The transmitter 720 includes an oscillator 722, e.g., a crystal oscillator (XO), for producing one or more signals including a carrier wave signal. The memory 730 may be configured similarly to the memory 211 and/or the memory 311, e.g., including software with processor-readable instructions configured to cause the processor 710 to perform functions.

The description herein may refer only to the processor 710 performing a function, but this includes other implementations such as where the processor 710 executes software (stored in the memory 730) and/or firmware. The description herein may refer to the PRS transmitter 700 performing a function as shorthand for one or more appropriate components (e.g., the processor 710 and the memory 730) of the PRS transmitter 700 performing the function. The description herein may refer to the PRS transmitter 700 as a PRS source or a PRS transmission source. The processor 710 (possibly in conjunction with the memory 730 and, as appropriate, the transmitter 720) includes a PRS transmission unit 750 and an initial carrier phase unit 760. The PRS transmission unit 750 is configured to determine PRS configurations (e.g., in conjunction with the server 400) and to transmit the PRS according to the determined configurations. The initial carrier phase unit 760 is configured to transmit indications of initial carrier phases of PRS (e.g., PRS resources) transmissions by the PRS transmitter 700. The initial carrier phase indications may be transmitted to the positioning entity 530 (e.g., in the TRP 300, the server 400, a UE, etc.) and/or to the apparatus 600 (e.g., a UE or TRP). Functionality of the PRS transmission unit 750 and the initial carrier phase unit 760 is discussed further herein, and the description may refer to the processor 710 generally, or the PRS transmitter 700 generally, as performing any of the functions of the PRS transmission unit 750 or the initial carrier phase unit 760.

Figure 8:
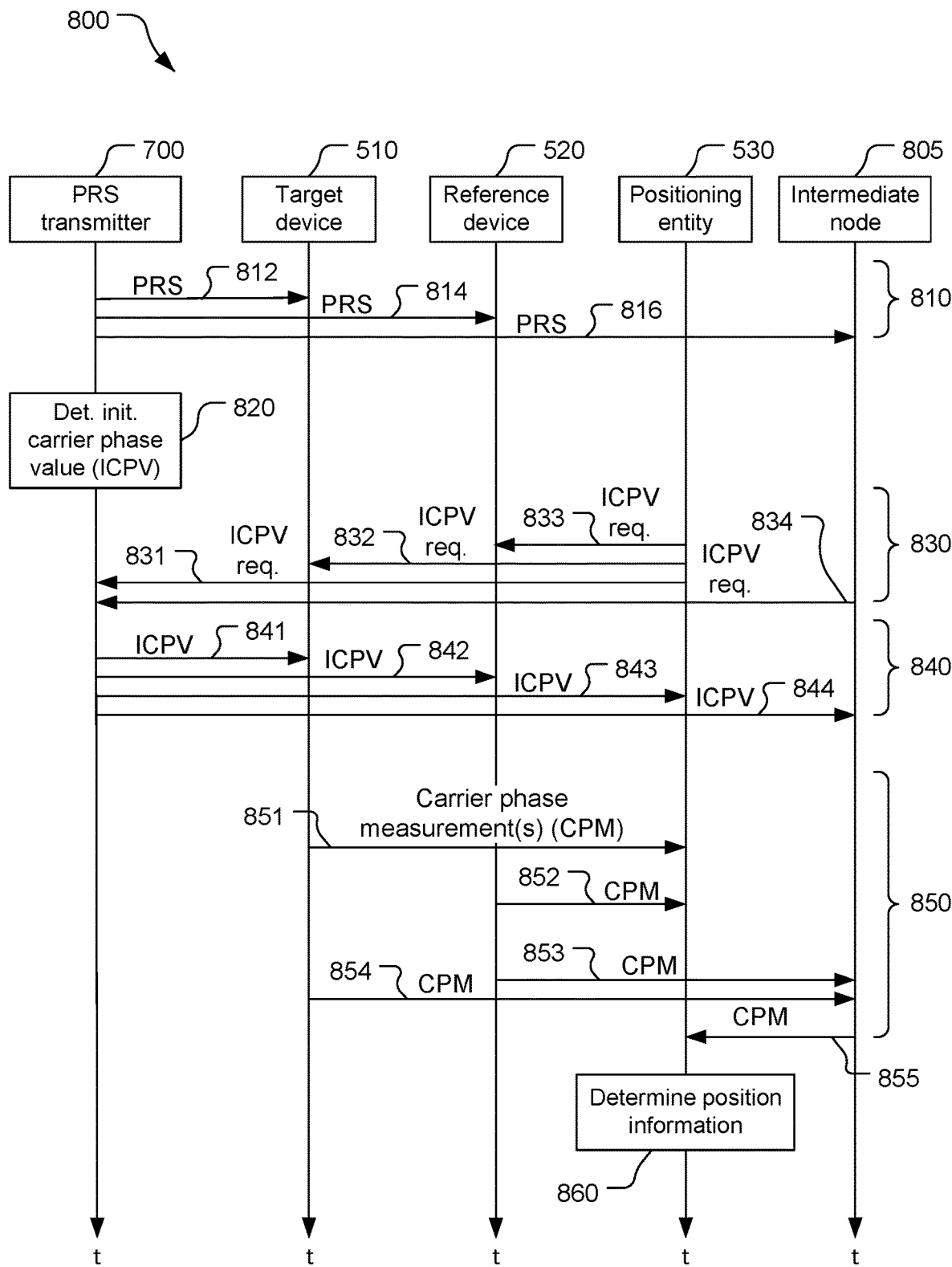
FIG. 8 is a simplified diagram of a process and signaling flow for measuring carrier phase and determining position information.

Referring to FIG. 8, with further reference to FIGS. 1-9, a signaling and process flow 800 for measuring carrier phase, and determining position information based on carrier phase measurements, includes the stages shown. The positioning entity 530 may be a standalone entity or a part of an entity (e.g., a UE, a TRP, a server). The positioning entity includes a receiver (e.g., a wireless receiver and an antenna and/or a wired receiver, such as the wireless receiver 444 and the antenna 446, and/or the wired receiver 454) to receive PRS measurements, and a processor and memory (e.g., the processor 410 and the memory 411) to process the PRS measurements to determine position information (e.g., ranges, position estimates, etc.).

Figure 9:
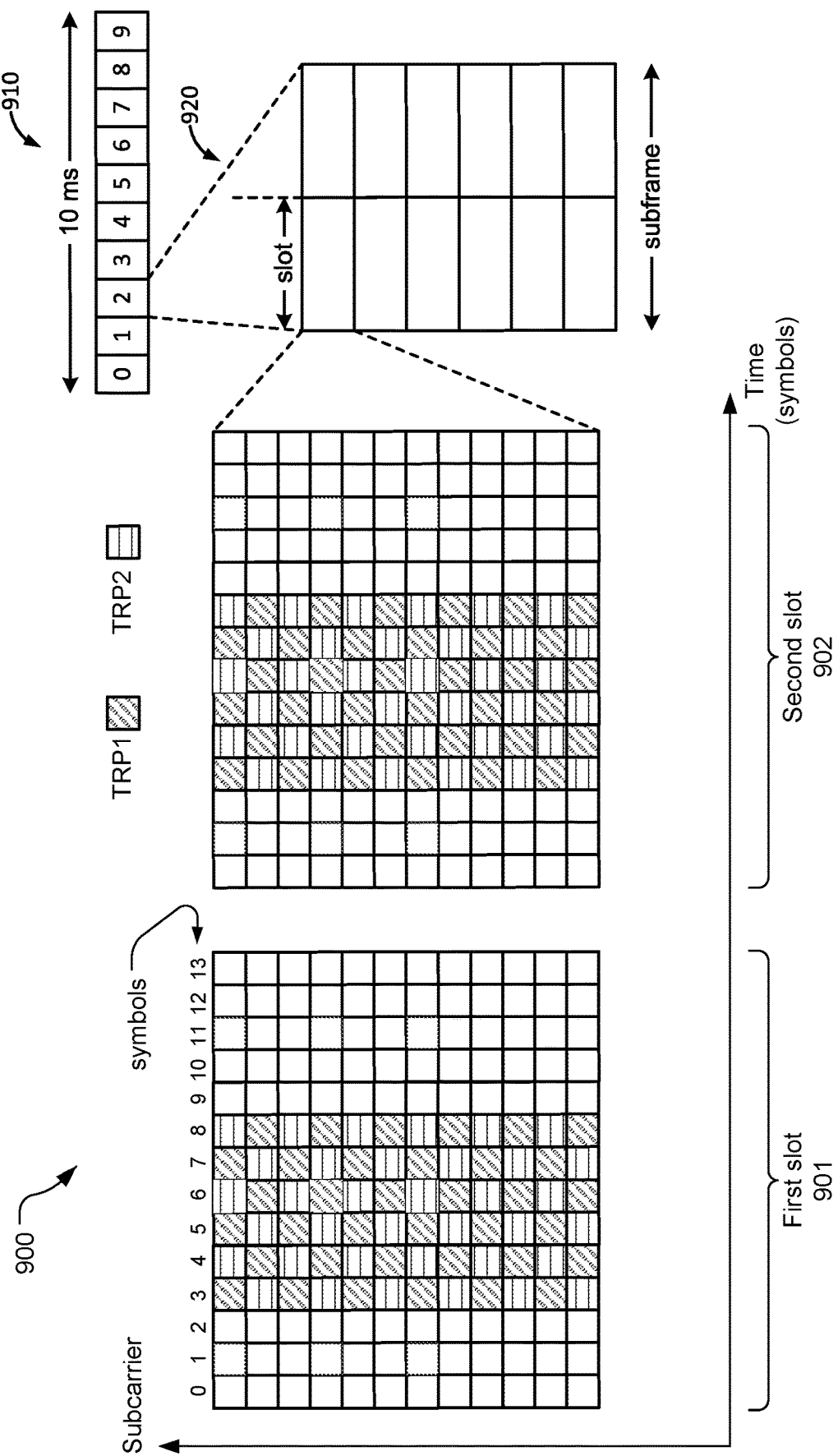
FIG. 9 is a timing diagram of example transmission configurations for positioning reference signals.
Figure 10:
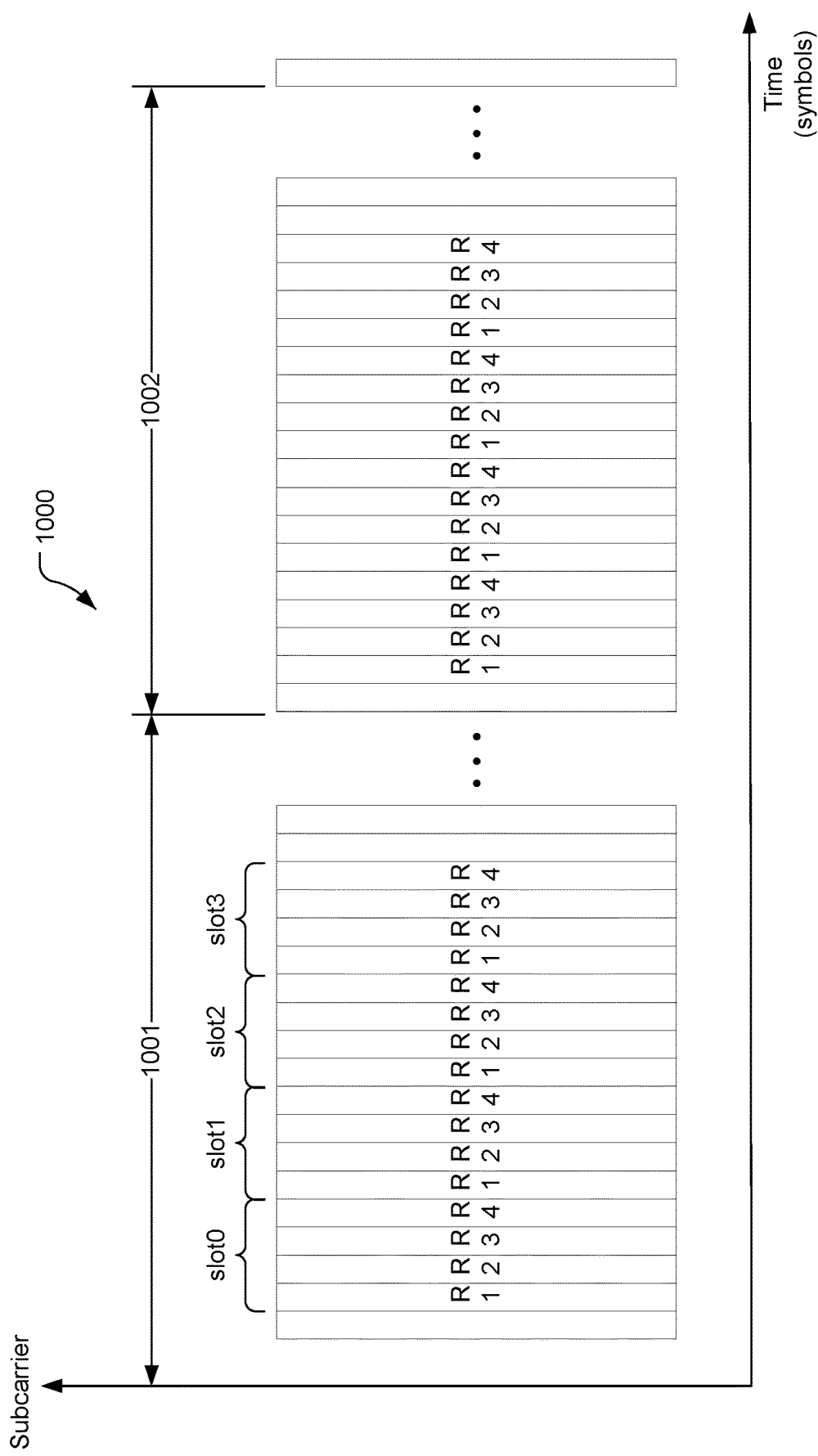
FIG. 10 is a simplified timing diagram of two occasions of a resource set.

At stage 810, the PRS transmitter 700, e.g., the PRS transmission unit 750, transmits PRS 812 to the target device and PRS 814 to the reference device 520, and may transmit PRS 816 to an intermediate node 805. The PRS transmission unit 750 may coordinate with the server 400 to determine a PRS configuration for each of the PRS 812, 814, 816, which may be the same or different. The PRS 812 may, for example, be transmitted over a Uu interface (Uu-PRS (e.g., DL-PRS)) with the PRS transmitter 700 being a TRP and the target device 510 being a UE, or as SL-PRS if the PRS transmitter 700 and the target device 510 are both UEs. The PRS 814 may be transmitted over a Uu interface (Uu-PRS (e.g., UL-PRS)) with the PRS transmitter 700 being a UE and the reference device 520 being a TRP. The PRS 816 may be transmitted over an appropriate interface as DL-PRS, UL-PRS, or SL-PRS depending on the types of devices of the PRS transmitter 700 and the intermediate node 805 (e.g., Uu interface and DL-PRS if the PRS transmitter 700 is a TRP and the intermediate node 805 is a UE, or an appropriate interface and format for PRS transmitted from TRP to TRP). Referring also to FIG. 9, a transmitted PRS may include multiple PRS resources repeatedly transmitted in multiple slots over multiple occasions. Here, a transmission schedule 900 has a comb-2 transmission, six symbols per repetition, and two repetitions per occasion. The transmission schedule 900 is for two slots, which is a portion of a larger transmission schedule for transmitting signals. Here, the transmission schedule 900 indicates positioning reference signals from two TRPs (TRP1 and TRP2) to be carried by symbols 3-8 of each of a first slot 901 and a second slot 902. In this example, the transmission schedule is for two slots of a subframe. In the time domain, a frame 910 (e.g., 10 ms) may be, as here, divided into 10 equally sized subframes 920 (e.g., 1 ms each). In this example, each subframe 920 includes two consecutive time slots, e.g., the slots 901, 902 (each of 0.5 ms). Referring also to FIG. 10, an example transmission schedule 1000 includes multiple occasions 1001, 1002, each including four PRS resources R1, R2, R3, R4 repeated across four slots in each occasion. As discussed above, the burst nature of PRS resources results in different initial carrier phases for the PRS resources (e.g., different PRS resources or the same PRS resource in different occasions).

Figure 11:
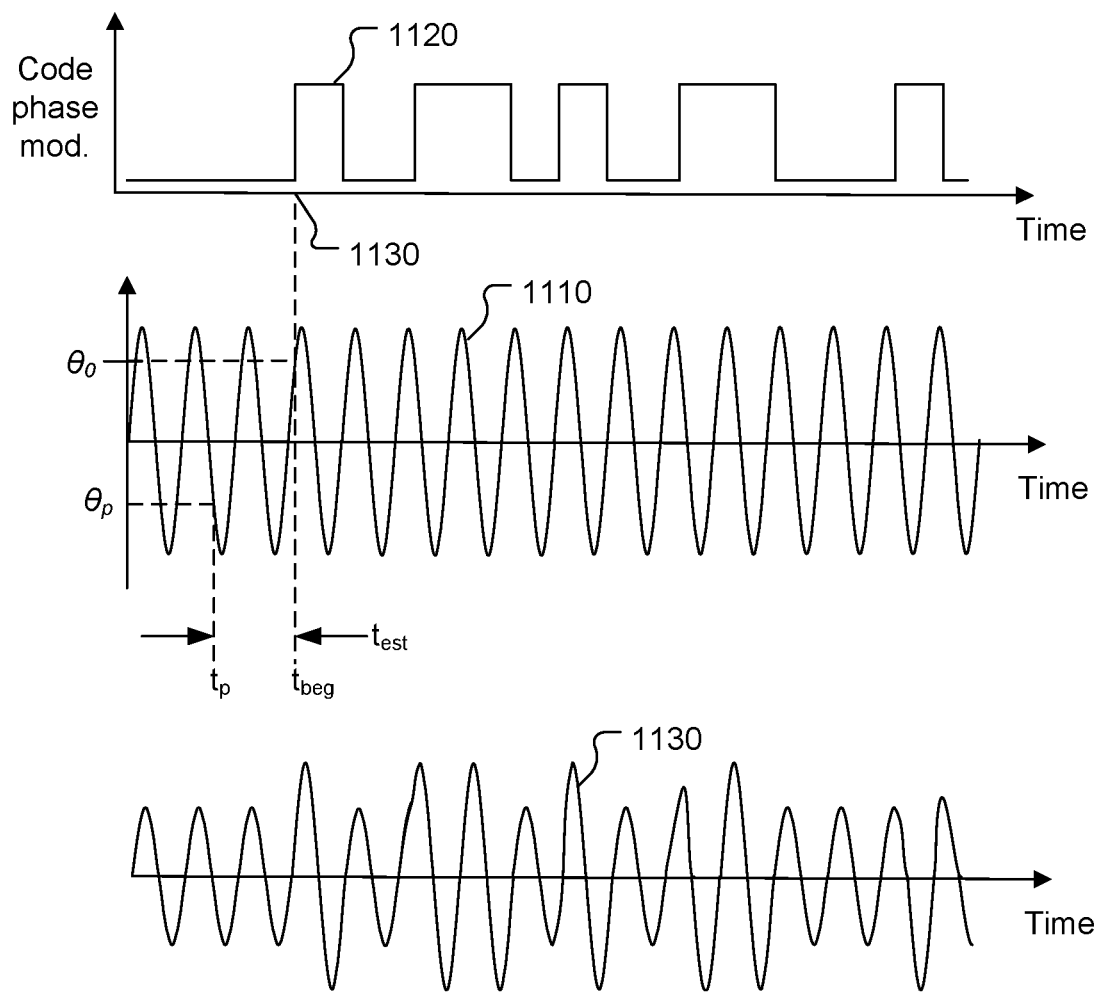
FIG. 11 is a timing diagram of a carrier wave signal and a code phase modulation signal.

At stage 820, the PRS transmitter 700, e.g., the initial carrier phase unit 760, determines the initial carrier phase value (ICPV) for each of the PRS 812, 814. For example, the initial carrier phase unit 760 may determine the ICPV of the PRS 812 as the initial carrier phase by monitoring the transmission of the PRS 812 and observing the carrier phase at the beginning of transmission of the PRS 812. Referring also to FIG. 11, a carrier signal 1110 is produced by the oscillator 722 of the PRS transmitter 700. The carrier signal 1110 (also called a carrier wave or a carrier) is a waveform used for modulation with a modulation signal to produce a new signal. Here, a code phase modulation signal 1120 is used by the transmitter 700 to modulate the carrier signal 1110 to produce a PRS 1130, e.g., the PRS 812, 814, 816, which comprises the code phase modulation signal 1120 and the carrier signal 1110. The code phase modulation signal 1120 begins at a time 1130 (also labeled $t_{beg}$). The initial carrier phase unit 760 may monitor an output of the oscillator 722 and the code phase modulation signal 1120 to determine the phase of the carrier signal 1110 at the time 1130 as the initial carrier phase $\theta_0$. As another example, the initial carrier phase unit 760 may determine the ICPV as an estimate of the initial carrier phase. The initial carrier phase unit 760 may, for example, determine a present carrier phase 90 from a present time $t_p$ and knowledge of a scheduled time of transmission of the PRS 812 (e.g., an estimated time test from the present time to begin transmission of the PRS 812) to estimate the initial carrier phase of the PRS 812, with the estimate being the ICPV. As another example, the PRS transmission unit 750 may control transmission of the PRS 812 to attempt to have the initial carrier phase of the PRS 812 be a desired (e.g., fixed) initial carrier phase and the initial carrier phase unit 760 may determine the ICPV of the PRS 812 as the desired initial carrier phase, although the actual initial carrier phase may be different than the desired initial carrier phase. Thus, the ICPV is an indication of the initial carrier phase of a PRS, such as the actual initial carrier phase, an estimate of the initial carrier phase, or a desired initial carrier phase that the PRS transmitter 700 attempts to ensure is the initial carrier phase. If the ICPV indicates an estimated initial carrier phase or a desired, controlled initial carrier phase, the ICPV may be transmitted by the PRS transmitter 700, to one or more destinations, before the PRS is(are) transmitted.

At stage 830, the PRS transmitter 700 may receive one or more requests 831, 832, 833, 834 for the ICPV (e.g., a request for the initial carrier phase). The requests 831, 832, 833, 834 may be sent directly (as shown) to the PRS transmitter 700, and/or may be sent indirectly (e.g., via the positioning entity 530 and/or one or more other apparatus) to the PRS transmitter 700. Stage 830 may be omitted from the flow 800 and the PRS transmitter 700 may transmit an ICPV based on one or more criteria other than receiving a request for the ICPV.

At stage 840, the PRS transmitter 700, e.g., the initial carrier phase unit 760, transmits indications of the ICPVs of the PRS 812 and the PRS 814. The initial carrier phase unit 760 may transmit an ICPV message 841 to the target device 510, an ICPV message 842 to the reference device 520, an ICPV message 843 to the positioning entity 530, and/or an ICPV message 844 to the intermediate node 805. The intermediate node 805 may be an example of the apparatus 600. An ICPV in any of the ICPV messages 841-844 may be the actual (absolute) initial carrier phase, or the estimated initial carrier phase, or the desired initial carrier phase at which the PRS transmitter 700 attempts to transmit the PRS. The PRS transmitter 700 may transmit an ICPV message directly and/or indirectly (e.g., via the intermediate node 805, which may be a TRP, a server, a UE, etc.) to a destination (e.g., the target device 510, the reference device 520, the positioning entity 530). For example, the PRS transmitter 700 may transmit an ICPV message directly to a UE (e.g., the target device 510 or the reference device 520) using MAC-CE (MAC-Control Element) and/or DCI (Downlink Control Information) if the PRS transmitter 700 is a TRP. If the PRS transmitter 700 is a TRP, then the PRS transmitter 700 may transmit an ICPV message indirectly to a UE (e.g., the target device 510 or the reference device 520) via the server 400 (e.g., an LMF, e.g., the positioning entity 530) by transmitting the ICPV message to the server 400 using NRPPa and having the server 400 transmit the ICPV message to the UE using LPP. The PRS transmitter 700 may transmit the ICPV message 843 to the positioning entity 530 using NRPPa if the PRS transmitter 700 is a TRP and the positioning entity 530 is, or is in, a UE. The PRS transmitter 700 may transmit the ICPV message 844 to the intermediate node 805 using an appropriate protocol depending on the types of devices of the PRS transmitter 700 and the intermediate node 805. If the PRS transmitter 700 is a UE, then the PRS transmitter 700 may transmit an ICPV message: directly to the server 400 using LPP; directly to a TRP using UCI or MAC-CE or RRC; indirectly to a TRP via the server by transmitting the ICPV message to the server 400 using LPP and the server 400 transmitting the ICPV message to the TRP using NRPPa; directly to another UE using SL; indirectly to another UE via an intermediate UE using SL between each of the UEs; indirectly to another UE via the TRP 300 by transmitting the ICPV message to the TRP 300 using LPP (over a Uu interface) and the TRP 300 transmitting (e.g., relaying) the ICPV message to the other UE using LPP; or indirectly to another UE via the server 400 by transmitting the ICPV message to the server 400 using LPP and the server 400 transmitting the ICPV message to the other UE using LPP. For example, a TRP that sends PRS to the target device 510 (e.g., is a neighbor TRP but not the serving TRP for the target device 510) may transmit the ICPV message 841 indirectly to the target device 510.

An ICPV may be indicated in any of the ICPV messages 841-844 in one or more of a variety of ways. For example, referring also to FIG. 12, the ICPV may indicate the absolute initial carrier phase of a PRS resource, for example, in degrees or radians. As shown in FIG. 12, an example ICPV message 1200 provides a hierarchical structure of TRP, PRS resource set, and PRS resource to provide indications of initial carrier phase for PRS resources. The ICPV message 1200 includes a TRP ID field 1210, a PRS resource set ID field 1220, a PRS ID field 1230, an occasion field 1240, and an initial carrier phase field 1250 for each entry, here for each of an entry 1260, an entry 1261, an entry 1262, an entry 1263, and entry 1264, an entry 1265, an entry 1266, and an entry 1267. For each of the entries 1260-1263, the initial carrier phase indicated in the initial carrier phase field 1250 corresponds to a respective combination of TRP ID, PRS resource set ID, occasion, and PRS resource ID to identify which PRS resource corresponds to the indicated initial carrier phase. A TRP ID may be provided once for all PRS resource sets, occasions, and PRS resources corresponding to that TRP to avoid repeatedly sending this ID, thus saving overhead. Similarly, a PRS resource set ID may be provided once for all occasions and PRS resources corresponding to that PRS resource set to avoid repeatedly sending this ID, thus saving overhead. Similarly, redundant occasion IDs may be avoided. As shown in this example, a full initial carrier phase for each PRS resource is indicated. Also as shown, the ICPV message 1200 may contain initial carrier phase values for multiple occasions of the same PRS resource.

As another example, the ICPV may indicate a relative phase such as a phase difference between the same PRS resource in different PRS resource occasions. The relative phase may be indicated by an incremental value of the phase difference, which may save overhead bits to convey the ICPV. As another example, the ICPV may indicate a relative phase such as a phase difference between different PRS resources. The different PRS resources may, for example, be in the same PRS resource set. The initial carrier phase of one PRS resource may be used as a baseline in a PRS resource set, and the initial carrier phase of each of the other PRS resources in the resource set may be indicated as a difference between that PRS resource and the baseline initial carrier phase. Similarly, for an ICPV message including multiple ICPVs, an ICPV for a baseline initial carrier phase may be indicated as an absolute phase and each of one or more other (e.g., all of the other) ICPVs in the ICPV message indicated as a phase difference to the baseline initial carrier phase. The PRS resource used as a baseline will typically be the PRS resource that is first in time among the PRS resources for which initial carrier phase is reported, but another PRS resource (i.e., after the first in time PRS resource) may be used as a baseline. For example, referring also to FIG. 13, an example ICPV message 1300 includes a TRP ID field 1310, a PRS resource set ID field 1320, a PRS resource ID field 1330, an occasion field 1340, and an initial carrier phase field 1350 for each entry, here for each of an entry 1360, and entry 1361, an entry 1362, an entry 1363, and entry 1364, an entry 1365, an entry 1366, and an entry 1367. In the ICPV message 1300, one PRS resource per PRS resource set is used as a baseline with a corresponding baseline initial carrier phase, and the initial carrier phases of other PRS resources in each PRS resource set is provided as a phase difference relative to the baseline initial carrier phase. For example, the initial carrier phase of the entry 1360 is used as a baseline for the PRS resource set corresponding to the entries 1360-1363. Thus, the initial carrier phase in the entry 1360 is provided in full, and the initial carrier phases in the entries 1361-1363 are provided as phase differences relative to the initial carrier phase in the entry 1360. Other configurations of baseline and relative initial carrier phases may be used. For example, a single baseline initial carrier phase may be used for all PRS resources corresponding to the same TRP, or corresponding to an entire ICPV message.

The ICPV messages 841-844 may include resolution information. For example, the PRS transmitter 700 may negotiate with the target device 510 and/or the reference device 520 to agree upon a resolution of initial carrier phase information to be provided by the PRS transmitter 700 to achieve a desired balance between overhead and accuracy. The ICPV message 841 may indicate the resolution of the initial carrier phase value provided to the target device 510. The ICPV message 842 may indicate the resolution of the initial carrier phase value provided to the reference device 520. The ICPV message 843 may indicate the resolutions of the initial carrier phase value provided to the target device 510 and to the reference device 520.

One or more of the ICPV messages 841-844 may be transmitted by the PRS transmitter 700 periodically, semi-persistently (for periodic periods that are triggered aperiodically), or aperiodically. For aperiodic reporting, the PRS transmitter 700 may respond to one or more of the requests 831-834 by providing (or attempting to provide) requested initial carrier phase information (for one or more indicated PRS resources, one or more PRS resource sets, etc.). For aperiodic or semi-persistent reporting, in response to receiving a request for initial carrier phase information, the PRS transmitter 700 may determine, e.g., based on a QoS provided by the PRS transmitter to the requesting device, whether to provide the requested information per request (guaranteed) or apply best efforts to provide the requested information. The QoS may be preconfigured, e.g., through RRC communications and may be different for different requesting devices. How frequently the PRS transmitter 700 provides initial carrier phase information and/or what initial carrier phase information the PRS transmitter 700 provides may be based on the QoS.

With the initial carrier phase information available, and the measured carrier phase θ(t) available, the fractional carrier phase θ can be determined. For example, the positioning entity 530, which may be in the target device 510 and/or the reference device 520, may use the measured carrier phase and the provided initial carrier phase information to determine the fractional carrier phase θ using Equation (1). For UE-based positioning, the target device 510 may determine the fractional carrier phase θ and determine position information (e.g., range, location estimate) for the target device 510 without providing carrier phase measurement information to another entity.

Figure 14:
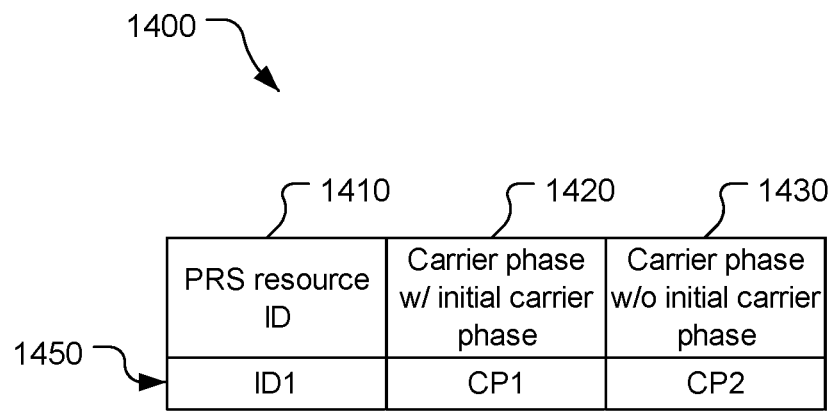
FIG. 14 is an example carrier phase measurement message.
Figure 15:
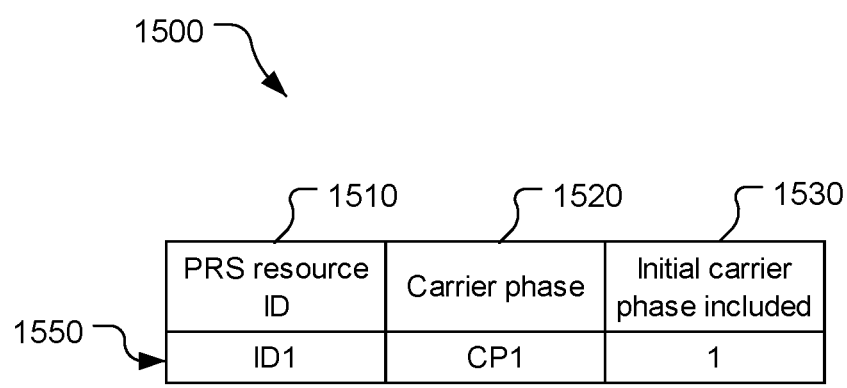
FIG. 15 is another example carrier phase measurement message.

At stage 850, the target device 510 and/or the reference device 520 may provide carrier phase measurement information to one or more other entities (e.g., for UE-assisted positioning). The PLL 622 can lock to and track the phase of the carrier signal 1110, or down convert the carrier phase to a local carrier frequency, and the processor 610 can use digital signal processing to monitor the carrier phase (original or local). The target device 510 may provide one or more carrier phase measurements (CPM) in a CPM message 851 to the positioning entity 530, and/or a CPM message 854 to the intermediate node 805. Similarly, the reference device 520 may provide a CPM message 852 to the positioning entity 530, and/or a CPM message 853 to the intermediate node 805. The CPM messages 851-854 provide one or more indications of the measurement type of the initial carrier phase measurement(s) provided, in particular whether a measurement includes the initial carrier phase or whether the initial carrier phase is excluded, e.g., an ICPV has been removed from a raw measurement of carrier phase that includes the initial carrier phase. For example, referring also to FIG. 14, an example CPM message 1400 includes a single entry 1450 of a PRS resource ID field 1410, a carrier phase with initial carrier phase field 1420, and a carrier phase without an initial carrier phase field 1430. The carrier phase with initial carrier phase field 1420 includes a value of the raw carrier phase measurement θ(t) that includes the initial carrier phase (i.e., the initial carrier phase has not been accounted for and removed from the measurement). The carrier phase with initial carrier phase field 1420 includes a value of the fractional carrier phase θ, with the initial carrier phase accounted for, with the initial phase (or an approximation thereof) having been removed from a raw carrier phase measurement. The inclusion of the raw and fractional carrier phase measurements in the appropriate fields in the CPM message 1400 provides an indication of whether each measurement includes the initial carrier phase or not. As another example, referring also to FIG. 15, an example CPM message 1500 includes a single entry 1550 of a PRS resource ID field 1510, a carrier phase field 1520, and an initial carrier phase included field 1530. The carrier phase field 1520 includes a value of a carrier phase measurement, which may be a raw carrier phase measurement that includes the initial carrier phase or a fractional carrier phase measurement that excludes an initial carrier phase value (i.e., the initial carrier phase or an approximation thereof). A value in the initial carrier phase included field 1530 indicates whether the carrier phase value in the carrier phase field 1520 is a raw carrier phase measurement or a fractional carrier phase measurement. For example, the value in the initial carrier phase included field 1530 may be a single bit, with a logical "0" indicating that the value of the carrier phase in the carrier phase field 1520 does not include the initial carrier phase (is a fractional carrier phase) and a logical "1" indicating that the value of the carrier phase in the carrier phase field 1520 includes the initial carrier phase (is a raw carrier phase). The CPM messages 1400, 1500 are examples, and other CPM messages may be used. For example, CPM messages will typically have more than one entry. Also, a single CPM message may include some carrier information that includes raw and fractional carrier phase (e.g., according to the example CPM message 1400) and carrier information that includes either raw or fractional carrier phase and an indication of which type the information is (e.g., according to the example CPM message 1500).

The intermediate node 805 may relay carrier phase information and may aggregate carrier phase information from multiple sources of CPM messages, e.g., the target device 510 and the reference device 520. For example, the carrier phase obtaining unit 650 of the intermediate node 805 may receive carrier phase information from the CPM message 852 and/or the CPM message 853. The intermediate node 805 may determine fractional carrier phase from raw carrier phase if the intermediate node 805 has the appropriate initial carrier phase information, e.g., from the ICPV message 844. The intermediate node 805 may collect carrier phase information from other entities without the intermediate node 805 making carrier phase measurements, or the intermediate node 805 (e.g., the carrier phase obtaining unit 650) may also make carrier phase measurements of the PRS 816 (or of the PRS 812 or 814 if the intermediate node is the target device 510 or the reference device 520). The intermediate node 805, e.g., the carrier phase reporting unit 660, may transmit carrier phase information (e.g., measured by the intermediate node 805 and/or collected from one or more other entities) in a CPM message 855 to the positioning entity 530 directly or indirectly using one or more appropriate protocols depending on the device types of the intermediate node 805 and the positioning entity 530. The carrier phase information in the CPM message 855 may, for example, be provided in a format of the example CPM message 1400 and/or the example CPM message 1500 to indicate whether the carrier phase information is raw carrier phase or fractional carrier phase.

At stage 860, the positioning entity determines position information. The positioning entity 530 receives the carrier phase measurements corresponding to the PRS transmitter 700, the target device 510, and the reference device 520, and receives carrier phase measurements corresponding to the target device 510 and one or more other PRS transmitters and/or one or more other reference devices. The positioning entity 530 (e.g., a processor such as the processor 210, and a memory such as the memory 211) uses the carrier phase measurements and corresponding initial carrier phase information, if needed, to determine RSTDs for the target device 510. For each carrier phase measurement, the positioning entity 530 receives information indicating whether the measurement includes the initial carrier phase or excludes the initial carrier phase. For each carrier phase measurement that includes the initial carrier phase, the positioning entity receives an indication of the initial carrier phase (which will typically be different for different PRS resources and for the same PRS resource in different occasions), from which the positioning entity calculates the carrier phase measurement excluding the initial carrier phase without the constraint of same PRS resource of same occasion. The positioning entity uses the carrier phase measurements with the initial carrier phases removed to determine the RSTD in accordance with Equation (15). The positioning entity determines multiple RSTDs for the target device 520 corresponding to different PRS transmitters 700. The positioning entity uses the RSTDs for the target device 510 and known locations of the different PRS transmitters 700 to determine a position estimate for the target device 510. The positioning entity 530 may provide the position information to the target device 510 and/or any other appropriate device, e.g., a location services (LCS) client (e.g., in the server 400).

Figure 16:
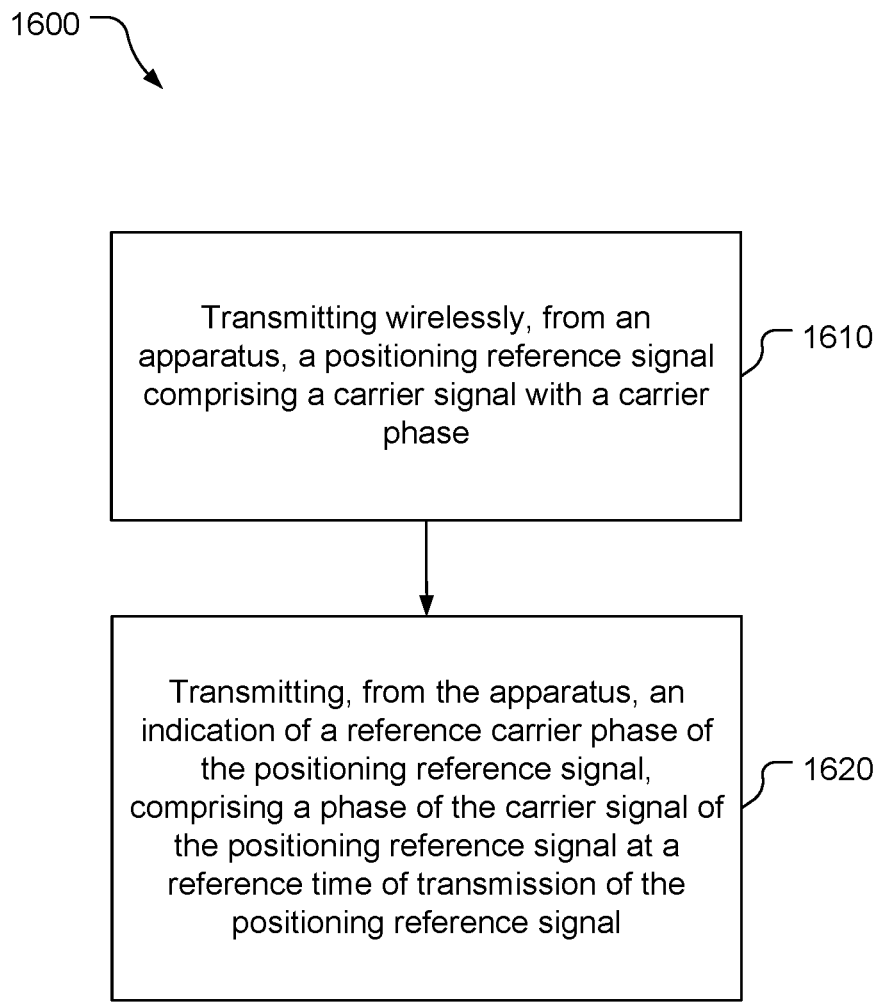
FIG. 16 is a block flow diagram of a method of providing positioning reference signal information.

Referring to FIG. 16, with further reference to FIGS. 1-16, a method 1600 of providing positioning reference signal information includes the stages shown. The method 1600 is, however, an example only and not limiting. The method 1600 may be altered, e.g., by having stages added, removed, rearranged, combined, performed concurrently, and/or having single stages split into multiple stages.

At stage 1610, the method 1600 includes transmitting wirelessly, from an apparatus, a positioning reference signal comprising a carrier signal with a carrier phase. For example, the PRS transmitter 700 transmits the PRS 812, 814, 816. The memory 730 (including processor-readable instructions), or the processor 710, possibly in combination with the memory 730, in combination with the transmitter 720 (e.g., a wireless transmitter and an antenna) may comprise means for transmitting, wirelessly, a PRS.

At stage 1620, the method 1600 includes transmitting, from the apparatus, an indication of a reference carrier phase of the positioning reference signal, comprising a phase of the carrier signal of the positioning reference signal at a reference time of transmission of the positioning reference signal. For example, the PRS transmitter 700 transmits one or more of the ICPV messages 841-844. One or more of the ICPV messages 841-844 may be transmitted wirelessly and/or via a wire connection and may be transmitted directly to a destination or indirectly via one or more intermediaries. Providing the indication of the initial carrier phase can enable high-accuracy carrier-phase-based positioning of a target device using terrestrial-based signaling, e.g., using burst PRS. The memory 730 (including processor-readable instructions), or the processor 710, possibly in combination with the memory 730, in combination with the transmitter 720 (e.g., a wireless transmitter and an antenna) may comprise means for transmitting the indication of the reference carrier phase of the PRS.

Implementations of the method 1600 may include one or more of the following features. In an example implementation, the indication of the reference carrier phase of the positioning reference signal indicates absolute phase. For example, an ICPV message may indicate absolute phase for one or more PRS resources, e.g., as shown in the entries 1260-1267 of the example ICPV message 1200, or in the entries 1360, 1364, 1366 of the example ICPV message 1300. In another example implementation, the indication of the reference carrier phase of the positioning reference signal indicates a relative phase of a positioning reference signal resource in a first positioning reference signal occasion relative to the positioning reference signal resource in a second positioning reference signal occasion that is separated in time from the first positioning reference signal occasion. For example, as shown in the example ICPV message 1300, an ICPV message may indicate carrier phases as a relative phase of one PRS resource (e.g., Res ID111) in one occasion (e.g., Occ2 as in the entry 1361) relative to the same PRS resource (Res ID 111) in another occasion (e.g., Occ1 in the entry 1360). In another example implementation, the indication of the reference carrier phase of the positioning reference signal indicates a relative phase of a first positioning reference signal resource in a positioning reference signal resource set relative to a second positioning reference signal resource in the positioning reference signal resource set. For example, the initial carrier phase of a PRS resource Res ID 112 in the entry 1362 is provided as a relative phase, relative to the initial carrier phase of the PRS resource Res ID111 in the entry 1360, with the PRS resources Res ID111 and Res ID112 being in the same PRS resource set (Set ID 11).

Also or alternatively, implementations of the method 1600 may include one or more of the following features. In an example implementation, the method 1600 includes transmitting, from the apparatus, a resolution indication indicating a resolution of the indication of the reference carrier phase of the positioning reference signal. For example, the PRS transmitter 700 may negotiate resolution for ICPVs with a device (e.g., the target device 510, the reference device 520, etc.) and provide an indication of the resolution to the device, e.g., in an ICPV message and/or in a separate message, e.g., at the conclusion of the negotiation of the resolution. In another example implementation, transmitting the indication of the reference carrier phase of the positioning reference signal comprises transmitting a plurality of indications of reference carrier phases in accordance with a hierarchy of positioning reference signal resource sets and positioning reference signal resources. For example, the PRS transmitter 700 can transmit ICPVs in a hierarchical data structure such as those shown in the example ICPV messages 1200, 1300. In another example implementation, the indication of the reference carrier phase of the positioning reference signal indicates a plurality of indications of reference carrier phases of separate positioning reference signal occasions of the positioning reference signal. For example, as shown in the example ICPV messages 1200, 1300, the PRS transmitter 700 may transmit multiple ICPVs corresponding to different PRS occasions (e.g., Occ1 and Occ2). In another example implementation, transmitting the indication of the reference carrier phase of the positioning reference signal comprises: transmitting a plurality of first reference carrier phase messages periodically, at least one of the plurality of the first reference carrier phase messages including the reference carrier phase of the positioning reference signal; or transmitting the plurality of the first reference carrier phase messages semi-persistently; or transmitting, aperiodically, a second reference carrier phase message including the reference carrier phase of the positioning reference signal. For example, the PRS transmitter 700 may be able to transmit ICPV messages periodically, or semi-persistently, or aperiodically. The memory 730 (including processor-readable instructions), or the processor 710, possibly in combination with the memory 730, in combination with the transmitter 720 (e.g., a wireless transmitter and an antenna 346) may comprise means for transmitting the first reference carrier phase messages periodically, and/or means for transmitting the plurality of first reference carrier phase message semi-periodically, and/or means for transmitting a second reference carrier phase message aperiodically.

Also or alternatively, implementations of the method 1600 may include one or more of the following features. In an example implementation, transmitting the indication of the reference carrier phase of the positioning reference signal comprises transmitting the reference carrier phase of the positioning reference signal in response to receiving a request for the reference carrier phase of the positioning reference signal. For example, the PRS transmitter 700 may transmit one or more of the ICPV messages 841-844 in response to receiving one or more of the requests 831-834, respectively, for ICPV. In a further example implementation, transmitting the indication of the reference carrier phase of the positioning reference signal comprises transmitting, according to a best effort or per request, the reference carrier phase of the positioning reference signal to a requesting device in response to receiving the request for the reference carrier phase of the positioning reference signal from the requesting device and based on a quality of service provided by the apparatus to the requesting device. For example, the PRS transmitter 700 may use best efforts to provide an ICPV message based on a QoS (e.g., as paid for by a user of a device such as the target device 510). The PRS transmitter 700 may determine whether to respond to a request or to apply best efforts to respond to the request with an ICPV message. For example, the PRS transmitter 700 may apply best efforts if the user has a low-end (e.g., inexpensive) subscription, and guarantee a response if the user has a high-end (e.g., expensive) subscription.

Also or alternatively, implementations of the method 1600 may include one or more of the following features. In an example implementation, the reference time of transmission of the positioning reference signal is a time of transmission of a first symbol of the positioning reference signal. The reference time of transmission may be the initial time of transmission, with the indication of the reference carrier phase being an indication of the initial carrier phase of the PRS. In another example implementation, the reference time of transmission of the positioning reference signal is a time of transmission of one of a slot of the positioning reference signal, or a subframe of the positioning reference signal, or a frame of the positioning reference signal. The reference time of transmission may be the time of transmission of a slot, a subframe, or a frame, e.g., the time of transmission of the first symbol in a slot, a subframe, or a frame, of the PRS.

Also or alternatively, implementations of the method 1600 may include one or more of the following features. In an example implementation, the indication of the reference carrier phase of the positioning reference signal indicates an actual reference carrier phase of the positioning reference signal when transmitted. For example, the PRS transmitter 700 may monitor PRS transmissions and provide an observed initial carrier phase as the indication of the initial carrier phase. In another example implementation, the indication of the reference carrier phase of the positioning reference signal indicates an estimate of the reference carrier phase of the positioning reference signal. For example, the PRS transmitter 700 may calculate what the initial carrier phase is expected to be, e.g., based on present carrier phase and expected (e.g., scheduled) time of transmission. In another example implementation, the method 1600 includes controlling the reference carrier phase of the positioning reference signal to be a desired value. The memory 730 (including processor-readable instructions), or the processor 710, in combination with the memory and the transmitter 720, may comprise means for controlling the reference carrier phase of the PRS.

Figure 17:
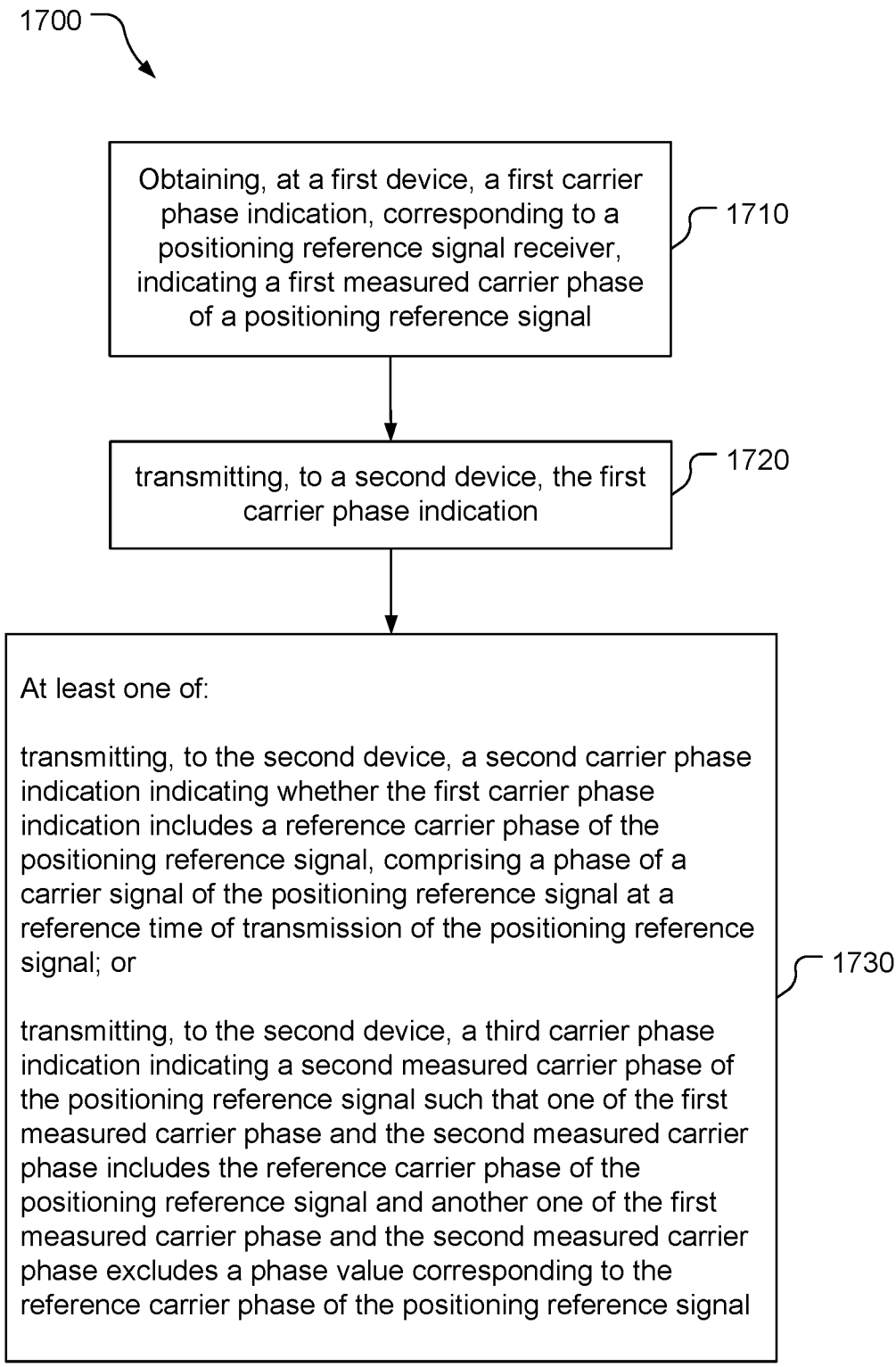
FIG. 17 is a block flow diagram of a method of providing carrier phase information.

Referring to FIG. 17, with further reference to FIGS. 1-16, a method 1700 of providing carrier phase information includes the stages shown. The method 1700 is, however, an example only and not limiting. The method 1700 may be altered, e.g., by having stages added, removed, rearranged, combined, performed concurrently, and/or having single stages split into multiple stages.

At stage 1710, the method 1700 includes obtaining, at a first device, a first carrier phase indication, corresponding to a positioning reference signal receiver, indicating a first measured carrier phase of a positioning reference signal. For example, an apparatus such as the target device 510, the reference device 520, or the intermediate node 805 may receive one or more carrier phase measurements from one or more other devices, and/or may measure PRS to determine one or more carrier phase measurements. The memory 630 (including processor-readable instructions), or the processor 610, possibly in combination with the memory 630, in combination with the transceiver 620 (e.g., a wireless receiver and an antenna) may comprise means for obtaining a first carrier phase indication.

At stage 1720, the method 1700 includes transmitting, to a second device, the first carrier phase indication. For example, the intermediate node 805 transmits the CPM message 855 to the positioning entity 530. The memory 630 (including processor-readable instructions), or the processor 610, possibly in combination with the memory 630, in combination with the transceiver 620 (e.g., a wireless transmitter and an antenna) may comprise means for transmitting the first carrier phase indication.

At stage 1730, the method 1700 includes at least one of: transmitting, to the second device, a second carrier phase indication indicating whether the first carrier phase indication includes a reference carrier phase of the positioning reference signal, comprising a phase of a carrier signal of the positioning reference signal at a reference time of transmission of the positioning reference signal; or transmitting, to the second device, a third carrier phase indication indicating a second measured carrier phase of the positioning reference signal such that one of the first measured carrier phase and the second measured carrier phase includes the reference carrier phase of the positioning reference signal and another one of the first measured carrier phase and the second measured carrier phase excludes a phase value corresponding to the reference carrier phase of the positioning reference signal. For example, the intermediate node 805 may transmit the CPM message 855 including one or more indications of carrier phase and corresponding indication(s) of whether the carrier phase is raw carrier phase or fractional carrier phase, and/or including one or more indications of raw carrier phase and fractional carrier phase. For example, the intermediate node 805 may transmit the CPM message 855 including one or more entries similar to the entry 1550 of the example CPM message 1500 and/or one or more entries similar to the entry 1450 of the example CPM message 1400. The phase value corresponding to the initial carrier phase may, for example, be an actual initial carrier phase, an estimated initial carrier phase, or a controlled (set) initial carrier phase. The memory 630 (including processor-readable instructions), or the processor 610, possibly in combination with the memory 630, in combination with the transceiver 620 (e.g., a wireless transmitter and an antenna) may comprise means for transmitting the second carrier phase indication and/or means for transmitting the third carrier phase indication.

Implementations of the method 1700 may include one or more of the following features. In an example implementation, obtaining the first carrier phase indication comprises: receiving the positioning reference signal; and measuring carrier phase of the positioning reference signal to determine the first measured carrier phase. For example, the intermediate node 805 may receive and measure PRS to obtain the first carrier phase indication, measuring raw carrier phase. The memory 630 (including processor-readable instructions), or the processor 610, possibly in combination with the memory 630, in combination with the transceiver 620 (e.g., a wireless receiver and an antenna) may comprise means for receiving PRS. The processor 610, possibly in combination with the memory 630, in combination with the transceiver 620 (e.g., a wireless receiver and an antenna) may comprise means for measuring the carrier phase of the PRS. In another example implementation, obtaining the first carrier phase indication comprises receiving the first carrier phase indication, and wherein the method further comprises: receiving the phase value corresponding to the reference carrier phase of the positioning reference signal; and subtracting, based on the first measured carrier phase of the positioning reference signal including the reference carrier phase of the positioning reference signal, the phase value corresponding to the reference carrier phase of the positioning reference signal from the first carrier phase indication. For example, the intermediate node 805 receives the ICPV message 844 from the PRS transmitter 700 and subtracts the ICPV from a raw carrier phase measurement of a PRS corresponding to the ICPV to determine a fractional carrier phase. The memory 630 (including processor-readable instructions), or the processor 610, possibly in combination with the memory 630, in combination with the transceiver 620 (e.g., a wireless receiver and an antenna, or possibly a wired receiver) may comprise means for receiving the phase value corresponding to the reference carrier phase of the PRS. The memory 630 (including processor-readable instructions), or the processor 610, possibly in combination with the memory 630, may comprise means for subtracting the phase value from the first carrier phase indication.

Implementation Examples

Implementation examples are provided in the following numbered clauses.

Clause 1. An apparatus comprising:
a transmitter;
a memory; and
a processor communicatively coupled to the transmitter and the memory and configured to:
transmit, wirelessly via the transmitter, a positioning reference signal comprising a carrier signal with a carrier phase; and
transmit, via the transmitter, an indication of a reference carrier phase of the positioning reference signal, comprising a phase of the carrier signal of the positioning reference signal at a reference time of transmission of the positioning reference signal.

Clause 2. The apparatus of clause 1, wherein the indication of the reference carrier phase of the positioning reference signal indicates absolute phase.

Clause 3. The apparatus of clause 1, wherein the indication of the reference carrier phase of the positioning reference signal indicates a relative phase of a positioning reference signal resource in a first positioning reference signal occasion relative to the positioning reference signal resource in a second positioning reference signal occasion that is separated in time from the first positioning reference signal occasion.

Clause 4. The apparatus of clause 1, wherein the indication of the reference carrier phase of the positioning reference signal indicates a relative phase of a first positioning reference signal resource in a positioning reference signal resource set relative to a second positioning reference signal resource in the positioning reference signal resource set.

Clause 5. The apparatus of clause 1, wherein the processor is further configured to transmit, via the transmitter, a resolution indication indicating a resolution of the indication of the reference carrier phase of the positioning reference signal.

Clause 6. The apparatus of clause 1, wherein the indication of the reference carrier phase of the positioning reference signal indicates a plurality of indications of reference carrier phases, and the processor is further configured to transmit the plurality of indications of reference carrier phases in accordance with a hierarchy of positioning reference signal resource sets and positioning reference signal resources.

Clause 7. The apparatus of clause 1, wherein the indication of the reference carrier phase of the positioning reference signal indicates a plurality of indications of reference carrier phases of separate positioning reference signal occasions of the positioning reference signal.

Clause 8. The apparatus of clause 1, wherein:
the processor is further configured to transmit a plurality of first reference carrier phase messages periodically, at least one of the plurality of the first reference carrier phase messages including the reference carrier phase of the positioning reference signal; or
the processor is further configured to transmit the plurality of the first reference carrier phase messages semi-persistently; or
the processor is further configured to transmit, aperiodically, a second reference carrier phase message including the reference carrier phase of the positioning reference signal; or
any combination thereof.

Clause 9. The apparatus of clause 1, wherein the processor is further configured to transmit the reference carrier phase of the positioning reference signal in response to receiving a request for the reference carrier phase of the positioning reference signal.

Clause 10. The apparatus of clause 9, wherein the processor is further configured to transmit, to a requesting device according to a best effort or per request, the indication of the reference carrier phase of the positioning reference signal in response to receiving the request for the reference carrier phase of the positioning reference signal from the requesting device and based on a quality of service provided by the apparatus to the requesting device.

Clause 11. The apparatus of clause 1, wherein the processor is further configured to determine the indication of the reference carrier phase of the positioning reference signal by monitoring the carrier phase of the positioning reference signal when the positioning reference signal is transmitted by the transmitter.

Clause 12. The apparatus of clause 1, wherein the processor is further configured to determine an estimate of the reference carrier phase of the positioning reference signal and the indication of the reference carrier phase of the positioning reference signal indicates the estimate of the reference carrier phase of the positioning reference signal.

Clause 13. The apparatus of clause 1, wherein the processor is further configured to transmit the positioning reference signal with a controlled reference carrier phase.

Clause 14. The apparatus of clause 1, wherein the reference time of transmission of the positioning reference signal is a time of transmission of a first symbol of the positioning reference signal.

Clause 15. The apparatus of clause 1, wherein the reference time of transmission of the positioning reference signal is a time of transmission of one of a slot of the positioning reference signal, or a subframe of the positioning reference signal, or a frame of the positioning reference signal.

Clause 16. A method of providing positioning reference signal information, the method comprising:
transmitting wirelessly, from an apparatus, a positioning reference signal comprising a carrier signal with a carrier phase; and
transmitting, from the apparatus, an indication of a reference carrier phase of the positioning reference signal, comprising a phase of the carrier signal of the positioning reference signal at a reference time of transmission of the positioning reference signal.

Clause 17. The method of clause 16, wherein the indication of the reference carrier phase of the positioning reference signal indicates absolute phase.

Clause 18. The method of clause 16, wherein the indication of the reference carrier phase of the positioning reference signal indicates a relative phase of a positioning reference signal resource in a first positioning reference signal occasion relative to the positioning reference signal resource in a second positioning reference signal occasion that is separated in time from the first positioning reference signal occasion.

Clause 19. The method of clause 16, wherein the indication of the reference carrier phase of the positioning reference signal indicates a relative phase of a first positioning reference signal resource in a positioning reference signal resource set relative to a second positioning reference signal resource in the positioning reference signal resource set.

Clause 20. The method of clause 16, further comprising transmitting, from the apparatus, a resolution indication indicating a resolution of the indication of the reference carrier phase of the positioning reference signal.

Clause 21. The method of clause 16, wherein transmitting the indication of the reference carrier phase of the positioning reference signal comprises transmitting a plurality of indications of reference carrier phases in accordance with a hierarchy of positioning reference signal resource sets and positioning reference signal resources.

Clause 22. The method of clause 16, wherein the indication of the reference carrier phase of the positioning reference signal indicates a plurality of indications of reference carrier phases of separate positioning reference signal occasions of the positioning reference signal.

Clause 23. The method of clause 16, wherein transmitting the indication of the reference carrier phase of the positioning reference signal comprises:
transmitting a plurality of first reference carrier phase messages periodically, at least one of the plurality of the first reference carrier phase messages including the reference carrier phase of the positioning reference signal; or
transmitting the plurality of the first reference carrier phase messages semi-persistently; or
transmitting, aperiodically, a second reference carrier phase message including the reference carrier phase of the positioning reference signal.

Clause 24. The method of clause 16, wherein transmitting the indication of the reference carrier phase of the positioning reference signal comprises transmitting the reference carrier phase of the positioning reference signal in response to receiving a request for the reference carrier phase of the positioning reference signal.

Clause 25. The method of clause 24, wherein transmitting the indication of the reference carrier phase of the positioning reference signal comprises transmitting, according to a best effort or per request, the reference carrier phase of the positioning reference signal to a requesting device in response to receiving the request for the reference carrier phase of the positioning reference signal from the requesting device and based on a quality of service provided by the apparatus to the requesting device.

Clause 26. The method of clause 16, wherein the indication of the reference carrier phase of the positioning reference signal indicates an actual reference carrier phase of the positioning reference signal when transmitted.

Clause 27. The method of clause 16, wherein the indication of the reference carrier phase of the positioning reference signal indicates an estimate of the reference carrier phase of the positioning reference signal.

Clause 28. The method of clause 16, further comprising controlling the reference carrier phase of the positioning reference signal to be a desired value.

Clause 29. The method of clause 16, wherein the reference time of transmission of the positioning reference signal is a time of transmission of a first symbol of the positioning reference signal.

Clause 30. The method of clause 16, wherein the reference time of transmission of the positioning reference signal is a time of transmission of one of a slot of the positioning reference signal, or a subframe of the positioning reference signal, or a frame of the positioning reference signal.

Clause 31. An apparatus comprising:
means for wirelessly transmitting a positioning reference signal comprising a carrier signal with a carrier phase; and
means for transmitting an indication of a reference carrier phase of the positioning reference signal, comprising a phase of the carrier signal of the positioning reference signal at a reference time of transmission of the positioning reference signal.

Clause 32. The apparatus of clause 31, wherein the indication of the reference carrier phase of the positioning reference signal indicates absolute phase.

Clause 33. The apparatus of clause 31, wherein the indication of the reference carrier phase of the positioning reference signal indicates a relative phase of a positioning reference signal resource in a first positioning reference signal occasion relative to the positioning reference signal resource in a second positioning reference signal occasion that is separated in time from the first positioning reference signal occasion.

Clause 34. The apparatus of clause 31, wherein the indication of the reference carrier phase of the positioning reference signal indicates a relative phase of a first positioning reference signal resource in a positioning reference signal resource set relative to a second positioning reference signal resource in the positioning reference signal resource set.

Clause 35. The apparatus of clause 31, further comprising means for transmitting a resolution indication indicating a resolution of the indication of the reference carrier phase of the positioning reference signal.

Clause 36. The apparatus of clause 31, wherein the means for transmitting the indication of the reference carrier phase of the positioning reference signal comprise means for transmitting a plurality of indications of reference carrier phases in accordance with a hierarchy of positioning reference signal resource sets and positioning reference signal resources.

Clause 37. The apparatus of clause 31, wherein the indication of the reference carrier phase of the positioning reference signal indicates a plurality of indications of reference carrier phases of separate positioning reference signal occasions of the positioning reference signal.

Clause The apparatus of clause 31, wherein the means for transmitting the indication of the reference carrier phase of the positioning reference signal comprise:
means for transmitting a plurality of first reference carrier phase messages periodically, at least one of the plurality of the first reference carrier phase messages including the reference carrier phase of the positioning reference signal; or
means for transmitting the plurality of the first reference carrier phase messages semi-persistently; or
means for transmitting, aperiodically, a second reference carrier phase message including the reference carrier phase of the positioning reference signal; or
any combination thereof.

Clause 39. The apparatus of clause 31, wherein the means for transmitting the indication of the reference carrier phase of the positioning reference signal comprise means for transmitting the reference carrier phase of the positioning reference signal in response to receiving a request for the reference carrier phase of the positioning reference signal.

Clause 40. The apparatus of clause 39, wherein the means for transmitting the indication of the reference carrier phase of the positioning reference signal comprise means for transmitting, according to a best effort or per request, the reference carrier phase of the positioning reference signal to a requesting device in response to receiving the request for the reference carrier phase of the positioning reference signal from the requesting device and based on a quality of service provided by the apparatus to the requesting device.

Clause 41. The apparatus of clause 31, wherein the indication of the reference carrier phase of the positioning reference signal indicates an actual reference carrier phase of the positioning reference signal when transmitted.

Clause 42. The apparatus of clause 31, wherein the indication of the reference carrier phase of the positioning reference signal indicates an estimate of the reference carrier phase of the positioning reference signal.

Clause 43. The apparatus of clause 31, further comprising means for controlling the reference carrier phase of the positioning reference signal to be a desired value.

Clause 44. The apparatus of clause 31, wherein the reference time of transmission of the positioning reference signal is a time of transmission of a first symbol of the positioning reference signal.

Clause 45. The apparatus of clause 31, wherein the reference time of transmission of the positioning reference signal is a time of transmission of one of a slot of the positioning reference signal, or a subframe of the positioning reference signal, or a frame of the positioning reference signal.

Clause 46. A non-transitory, processor-readable storage medium comprising processor-readable instructions to cause a processor, of an apparatus, to:
transmit, wirelessly, a positioning reference signal comprising a carrier signal with a carrier phase; and
transmit an indication of a reference carrier phase of the positioning reference signal, comprising a phase of the carrier signal of the positioning reference signal at a reference time of transmission of the positioning reference signal.

Clause 47. The storage medium of clause 46, wherein the indication of the reference carrier phase of the positioning reference signal indicates absolute phase.

Clause 48. The storage medium of clause 46, wherein the indication of the reference carrier phase of the positioning reference signal indicates a relative phase of a positioning reference signal resource in a first positioning reference signal occasion relative to the positioning reference signal resource in a second positioning reference signal occasion that is separated in time from the first positioning reference signal occasion.

Clause 49. The storage medium of clause 46, wherein the indication of the reference carrier phase of the positioning reference signal indicates a relative phase of a first positioning reference signal resource in a positioning reference signal resource set relative to a second positioning reference signal resource in the positioning reference signal resource set.

Clause 50. The storage medium of clause 46, further comprising processor-readable instructions to cause the processor to transmit a resolution indication indicating a resolution of the indication of the reference carrier phase of the positioning reference signal.

Clause 51. The storage medium of clause 46, wherein the processor-readable instructions to cause the processor to transmit the indication of the reference carrier phase of the positioning reference signal comprise processor-readable instructions to cause the processor to transmit a plurality of indications of reference carrier phases in accordance with a hierarchy of positioning reference signal resource sets and positioning reference signal resources.

Clause 52. The storage medium of clause 46, wherein the indication of the reference carrier phase of the positioning reference signal indicates a plurality of indications of reference carrier phases of separate positioning reference signal occasions of the positioning reference signal.

Clause 53. The storage medium of clause 46, wherein the processor-readable instructions to cause the processor to transmit the indication of the reference carrier phase of the positioning reference signal comprise:
  processor-readable instructions to cause the processor to transmit a plurality of first reference carrier phase messages periodically, at least one of the plurality of the first reference carrier phase messages including the reference carrier phase of the positioning reference signal; or
  processor-readable instructions to cause the processor to transmit the plurality of the first reference carrier phase messages semi-persistently; or
  processor-readable instructions to cause the processor to transmit, aperiodically, a second reference carrier phase message including the reference carrier phase of the positioning reference signal; or
  any combination thereof.

Clause 54. The storage medium of clause 46, wherein the processor-readable instructions to cause the processor to transmit the indication of the reference carrier phase of the positioning reference signal comprise processor-readable instructions to cause the processor to transmit the reference carrier phase of the positioning reference signal in response to receiving a request for the reference carrier phase of the positioning reference signal.

Clause 55. The storage medium of clause 54, wherein the processor-readable instructions to cause the processor to transmit the indication of the reference carrier phase of the positioning reference signal comprise processor-readable instructions to cause the processor to transmit, according to a best effort or per request, the reference carrier phase of the positioning reference signal to a requesting device in response to receiving the request for the reference carrier phase of the positioning reference signal from the requesting device and based on a quality of service provided by the apparatus to the requesting device.

Clause 56. The storage medium of clause 46, wherein the indication of the reference carrier phase of the positioning reference signal indicates an actual reference carrier phase of the positioning reference signal when transmitted.

Clause 57. The storage medium of clause 46, wherein the indication of the reference carrier phase of the positioning reference signal indicates an estimate of the reference carrier phase of the positioning reference signal.

Clause 58. The storage medium of clause 46, further comprising means for controlling the reference carrier phase of the positioning reference signal to be a desired value.

Clause 59. The storage medium of clause 46, wherein the reference time of transmission of the positioning reference signal is a time of transmission of a first symbol of the positioning reference signal.

Clause 60. The storage medium of clause 46, wherein the reference time of transmission of the positioning reference signal is a time of transmission of one of a slot of the positioning reference signal, or a subframe of the positioning reference signal, or a frame of the positioning reference signal.

Clause 61. A device comprising:
  a transceiver;
  a memory; and
  a processor communicatively coupled to the transceiver and the memory and configured to:
    obtain a first carrier phase indication, corresponding to a positioning reference signal receiver, indicating a first measured carrier phase of a positioning reference signal;
    transmit, via the transceiver, the first carrier phase indication; and
    at least one of:
      transmit, via the transceiver, a second carrier phase indication indicating whether the first carrier phase indication includes a reference carrier phase of the positioning reference signal, comprising a phase of a carrier signal of the positioning reference signal at a reference time of transmission of the positioning reference signal; or
      transmit, via the transceiver, a third carrier phase indication indicating a second measured carrier phase of the positioning reference signal such that one of the first measured carrier phase and the second measured carrier phase includes the reference carrier phase of the positioning reference signal and another one of the first measured carrier phase and the second measured carrier phase excludes a phase value corresponding to the reference carrier phase of the positioning reference signal.

Clause 62. The device of clause 61, wherein to obtain the first carrier phase indication the processor is further configured to:
  receive, via the transceiver, the positioning reference signal; and
  measure carrier phase of the positioning reference signal to determine the first measured carrier phase.

Clause 63. The device of clause 61, wherein to obtain the first carrier phase indication the processor is further configured to receive, via the transceiver, the first carrier phase indication, and wherein the processor is further configured to:
  receive, via the transceiver, the phase value corresponding to the reference carrier phase of the positioning reference signal; and subtract, based on the first measured carrier phase of the positioning reference signal including the reference carrier phase of the positioning reference signal, the phase value corresponding to the reference carrier phase of the positioning reference signal from the first carrier phase indication.

Clause 64. A method of providing carrier phase information, the method comprising:
  obtaining, at a first device, a first carrier phase indication, corresponding to a positioning reference signal receiver, indicating a first measured carrier phase of a positioning reference signal;
  transmitting, to a second device, the first carrier phase indication; and
  at least one of:
    transmitting, to the second device, a second carrier phase indication indicating whether the first carrier phase indication includes a reference carrier phase of the positioning reference signal, comprising a phase of a carrier signal of the positioning reference signal at a reference time of transmission of the positioning reference signal; or
    transmitting, to the second device, a third carrier phase indication indicating a second measured carrier phase of the positioning reference signal such that one of the first measured carrier phase and the second measured carrier phase includes the reference carrier phase of the positioning reference signal and another one of the first measured carrier phase and the second measured carrier phase excludes a phase value corresponding to the reference carrier phase of the positioning reference signal.

Clause 65. The method of clause 64, wherein obtaining the first carrier phase indication comprises:
  receiving the positioning reference signal; and
  measuring carrier phase of the positioning reference signal to determine the first measured carrier phase.

Clause 66. The method of clause 64, wherein obtaining the first carrier phase indication comprises receiving the first carrier phase indication, and wherein the method further comprises:
  receiving the phase value corresponding to the reference carrier phase of the positioning reference signal; and
  subtracting, based on the first measured carrier phase of the positioning reference signal including the reference carrier phase of the positioning reference signal, the phase value corresponding to the reference carrier phase of the positioning reference signal from the first carrier phase indication.

Clause 67. A first device comprising:
  means for obtaining a first carrier phase indication, corresponding to a positioning reference signal receiver, indicating a first measured carrier phase of a positioning reference signal;
  means for transmitting, to a second device, the first carrier phase indication; and
  at least one of:
    means for transmitting, to the second device, a second carrier phase indication indicating whether the first carrier phase indication includes a reference carrier phase of the positioning reference signal, comprising a phase of a carrier signal of the positioning reference signal at a reference time of transmission of the positioning reference signal; or
    means for transmitting, to the second device, a third carrier phase indication indicating a second measured carrier phase of the positioning reference signal such that one of the first measured carrier phase and the second measured carrier phase includes the reference carrier phase of the positioning reference signal and another one of the first measured carrier phase and the second measured carrier phase excludes a phase value corresponding to the reference carrier phase of the positioning reference signal.

Clause 68. The first device of clause 67, wherein the means for obtaining the first carrier phase indication comprise:
  means for receiving the positioning reference signal; and
  means for measuring carrier phase of the positioning reference signal to determine the first measured carrier phase.

Clause 69. The first device of clause 67, wherein the means for obtaining the first carrier phase indication comprise means for receiving the first carrier phase indication, and wherein the first device further comprises:
  means for receiving the phase value corresponding to the reference carrier phase of the positioning reference signal; and
  means for subtracting, based on the first measured carrier phase of the positioning reference signal including the reference carrier phase of the positioning reference signal, the phase value corresponding to the reference carrier phase of the positioning reference signal from the first carrier phase indication.

Clause 70. A non-transitory, processor-readable storage medium comprising processor-readable instructions to cause a processor of a first device to:
  obtain a first carrier phase indication, corresponding to a positioning reference signal receiver, indicating a first measured carrier phase of a positioning reference signal;
  transmit, to a second device, the first carrier phase indication; and
  at least one of:
    transmit, to the second device, a second carrier phase indication indicating whether the first carrier phase indication includes a reference carrier phase of the positioning reference signal, comprising a phase of a carrier signal of the positioning reference signal at a reference time of transmission of the positioning reference signal; or
    transmit, to the second device, a third carrier phase indication indicating a second measured carrier phase of the positioning reference signal such that one of the first measured carrier phase and the second measured carrier phase includes the reference carrier phase of the positioning reference signal and another one of the first measured carrier phase and the second measured carrier phase excludes a phase value corresponding to the reference carrier phase of the positioning reference signal.

Clause 71. The storage medium of clause 70, wherein the processor-readable instructions to cause the processor to obtain the first carrier phase indication comprise processor-readable instructions to cause the processor to:
  receive the positioning reference signal; and
  measure carrier phase of the positioning reference signal to determine the first measured carrier phase.

Clause 72. The storage medium of clause 70, wherein the processor-readable instructions to cause the processor to obtain the first carrier phase indication comprise processor-readable instructions to cause the processor to receive the first carrier phase indication, and wherein the storage medium further comprises processor-readable instructions to cause the processor to:

receive the phase value corresponding to the reference carrier phase of the positioning reference signal; and subtract, based on the first measured carrier phase of the positioning reference signal including the reference carrier phase of the positioning reference signal, the phase value corresponding to the reference carrier phase of the positioning reference signal from the first carrier phase indication.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. An apparatus comprising:
a transmitter;
a memory; and
a processor communicatively coupled to the transmitter and the memory and configured to:
transmit, wirelessly via the transmitter, a positioning reference signal comprising a carrier signal with a carrier phase; and
transmit, via the transmitter, an indication of a reference carrier phase of the positioning reference signal, comprising a phase of the carrier signal of the positioning reference signal at a reference time of transmission of the positioning reference signal.

2. The apparatus of claim 1, wherein the indication of the reference carrier phase of the positioning reference signal indicates absolute phase.

3. The apparatus of claim 1, wherein the indication of the reference carrier phase of the positioning reference signal indicates a relative phase of a positioning reference signal resource in a first positioning reference signal occasion relative to the positioning reference signal resource in a second positioning reference signal occasion that is separated in time from the first positioning reference signal occasion.

4. The apparatus of claim 1, wherein the indication of the reference carrier phase of the positioning reference signal indicates a relative phase of a first positioning reference signal resource in a positioning reference signal resource set relative to a second positioning reference signal resource in the positioning reference signal resource set.

5. The apparatus of claim 1, wherein the processor is further configured to transmit, via the transmitter, a resolution indication indicating a resolution of the indication of the reference carrier phase of the positioning reference signal.

6. The apparatus of claim 1, wherein the indication of the reference carrier phase of the positioning reference signal indicates a plurality of indications of reference carrier phases, and the processor is further configured to transmit the plurality of indications of reference carrier phases in accordance with a hierarchy of positioning reference signal resource sets and positioning reference signal resources.

7. The apparatus of claim 1, wherein the indication of the reference carrier phase of the positioning reference signal indicates a plurality of indications of reference carrier phases of separate positioning reference signal occasions of the positioning reference signal.

8. The apparatus of claim 1, wherein:
the processor is further configured to transmit a plurality of first reference carrier phase messages periodically, at least one of the plurality of the first reference carrier phase messages including the reference carrier phase of the positioning reference signal; or
the processor is further configured to transmit the plurality of the first reference carrier phase messages semi-persistently; or
the processor is further configured to transmit, aperiodically, a second reference carrier phase message including the reference carrier phase of the positioning reference signal; or
any combination thereof.

9. The apparatus of claim 1, wherein the processor is further configured to transmit the reference carrier phase of the positioning reference signal in response to receiving a request for the reference carrier phase of the positioning reference signal.

10. The apparatus of claim 9, wherein the processor is further configured to transmit, to a requesting device according to a best effort or per request, the indication of the reference carrier phase of the positioning reference signal in response to receiving the request for the reference carrier phase of the positioning reference signal from the requesting device and based on a quality of service provided by the apparatus to the requesting device.

11. The apparatus of claim 1, wherein the processor is further configured to determine the indication of the reference carrier phase of the positioning reference signal by monitoring the carrier phase of the positioning reference signal when the positioning reference signal is transmitted by the transmitter.

12. The apparatus of claim 1, wherein the processor is further configured to determine an estimate of the reference carrier phase of the positioning reference signal and the indication of the reference carrier phase of the positioning reference signal indicates the estimate of the reference carrier phase of the positioning reference signal.

13. The apparatus of claim 1, wherein the processor is further configured to transmit the positioning reference signal with a controlled reference carrier phase.

14. The apparatus of claim 1, wherein the reference time of transmission of the positioning reference signal is a time of transmission of a first symbol of the positioning reference signal.

15. The apparatus of claim 1, wherein the reference time of transmission of the positioning reference signal is a time of transmission of one of a slot of the positioning reference signal, or a subframe of the positioning reference signal, or a frame of the positioning reference signal.

16. A method of providing positioning reference signal information, the method comprising:
transmitting wirelessly, from an apparatus, a positioning reference signal comprising a carrier signal with a carrier phase; and
transmitting, from the apparatus, an indication of a reference carrier phase of the positioning reference signal, comprising a phase of the carrier signal of the positioning reference signal at a reference time of transmission of the positioning reference signal.

17. The method of claim 16, wherein the indication of the reference carrier phase of the positioning reference signal indicates absolute phase.

18. The method of claim 16, wherein the indication of the reference carrier phase of the positioning reference signal indicates a relative phase of a positioning reference signal resource in a first positioning reference signal occasion relative to the positioning reference signal resource in a second positioning reference signal occasion that is separated in time from the first positioning reference signal occasion.

19. The method of claim 16, wherein the indication of the reference carrier phase of the positioning reference signal indicates a relative phase of a first positioning reference signal resource in a positioning reference signal resource set relative to a second positioning reference signal resource in the positioning reference signal resource set.

20. The method of claim 16, further comprising transmitting, from the apparatus, a resolution indication indicating a resolution of the indication of the reference carrier phase of the positioning reference signal.

21. The method of claim 16, wherein transmitting the indication of the reference carrier phase of the positioning reference signal comprises transmitting a plurality of indications of reference carrier phases in accordance with a hierarchy of positioning reference signal resource sets and positioning reference signal resources.

22. The method of claim 16, wherein the indication of the reference carrier phase of the positioning reference signal indicates a plurality of indications of reference carrier phases of separate positioning reference signal occasions of the positioning reference signal.

23. The method of claim 16, wherein transmitting the indication of the reference carrier phase of the positioning reference signal comprises:
   transmitting a plurality of first reference carrier phase messages periodically, at least one of the plurality of the first reference carrier phase messages including the reference carrier phase of the positioning reference signal; or
   transmitting the plurality of the first reference carrier phase messages semi-persistently; or
   transmitting, aperiodically, a second reference carrier phase message including the reference carrier phase of the positioning reference signal.

24. The method of claim 16, wherein transmitting the indication of the reference carrier phase of the positioning reference signal comprises transmitting the reference carrier phase of the positioning reference signal in response to receiving a request for the reference carrier phase of the positioning reference signal.

25. The method of claim 24, wherein transmitting the indication of the reference carrier phase of the positioning reference signal comprises transmitting, according to a best effort or per request, the reference carrier phase of the positioning reference signal to a requesting device in response to receiving the request for the reference carrier phase of the positioning reference signal from the requesting device and based on a quality of service provided by the apparatus to the requesting device.

26. The method of claim 16, wherein the indication of the reference carrier phase of the positioning reference signal indicates an actual reference carrier phase of the positioning reference signal when transmitted.

27. The method of claim 16, wherein the indication of the reference carrier phase of the positioning reference signal indicates an estimate of the reference carrier phase of the positioning reference signal.

28. The method of claim 16, further comprising controlling the reference carrier phase of the positioning reference signal to be a desired value.

29. The method of claim 16, wherein the reference time of transmission of the positioning reference signal is a time of transmission of a first symbol of the positioning reference signal.

30. The method of claim 16, wherein the reference time of transmission of the positioning reference signal is a time of transmission of one of a slot of the positioning reference signal, or a subframe of the positioning reference signal, or a frame of the positioning reference signal.

31. An apparatus comprising:
   means for wirelessly transmitting a positioning reference signal comprising a carrier signal with a carrier phase; and
   means for transmitting an indication of a reference carrier phase of the positioning reference signal, comprising a phase of the carrier signal of the positioning reference signal at a reference time of transmission of the positioning reference signal.

32. A device comprising:
   a transceiver;
   a memory; and
   a processor communicatively coupled to the transceiver and the memory and configured to:
      obtain a first carrier phase indication, corresponding to a positioning reference signal receiver, indicating a first measured carrier phase of a positioning reference signal;
      transmit, via the transceiver, the first carrier phase indication; and
      at least one of:
         transmit, via the transceiver, a second carrier phase indication indicating whether the first carrier phase indication includes a reference carrier phase of the positioning reference signal, comprising a phase of a carrier signal of the positioning reference signal at a reference time of transmission of the positioning reference signal; or
         transmit, via the transceiver, a third carrier phase indication indicating a second measured carrier phase of the positioning reference signal such that one of the first measured carrier phase and the second measured carrier phase includes the reference carrier phase of the positioning reference signal and another one of the first measured carrier phase and the second measured carrier phase excludes a phase value corresponding to the reference carrier phase of the positioning reference signal.

33. The device of claim 32, wherein to obtain the first carrier phase indication the processor is further configured to:
   receive, via the transceiver, the positioning reference signal; and
   measure carrier phase of the positioning reference signal to determine the first measured carrier phase.

34. The device of claim 32, wherein to obtain the first carrier phase indication the processor is further configured to receive, via the transceiver, the first carrier phase indication, and wherein the processor is further configured to:

receive, via the transceiver, the phase value corresponding to the reference carrier phase of the positioning reference signal; and subtract, based on the first measured carrier phase of the positioning reference signal including the reference carrier phase of the positioning reference signal, the phase value corresponding to the reference carrier phase of the positioning reference signal from the first carrier phase indication.

35. A method of providing carrier phase information, the method comprising:

obtaining, at a first device, a first carrier phase indication, corresponding to a positioning reference signal receiver, indicating a first measured carrier phase of a positioning reference signal;

transmitting, to a second device, the first carrier phase indication; and at least one of:
  transmitting, to the second device, a second carrier phase indication indicating whether the first carrier phase indication includes a reference carrier phase of the positioning reference signal, comprising a phase of a carrier signal of the positioning reference signal at a reference time of transmission of the positioning reference signal; or
  transmitting, to the second device, a third carrier phase indication indicating a second measured carrier phase of the positioning reference signal such that one of the first measured carrier phase and the second measured carrier phase includes the reference carrier phase of the positioning reference signal and another one of the first measured carrier phase and the second measured carrier phase excludes a phase value corresponding to the reference carrier phase of the positioning reference signal.

36. The method of claim 35, wherein obtaining the first carrier phase indication comprises:

receiving the positioning reference signal; and measuring carrier phase of the positioning reference signal to determine the first measured carrier phase.

37. The method of claim 35, wherein obtaining the first carrier phase indication comprises receiving the first carrier phase indication, and wherein the method further comprises:

receiving the phase value corresponding to the reference carrier phase of the positioning reference signal; and subtracting, based on the first measured carrier phase of the positioning reference signal including the reference carrier phase of the positioning reference signal, the phase value corresponding to the reference carrier phase of the positioning reference signal from the first carrier phase indication.

38. A first device comprising:

means for obtaining a first carrier phase indication, corresponding to a positioning reference signal receiver, indicating a first measured carrier phase of a positioning reference signal;

means for transmitting, to a second device, the first carrier phase indication; and at least one of:
  means for transmitting, to the second device, a second carrier phase indication indicating whether the first carrier phase indication includes a reference carrier phase of the positioning reference signal, comprising a phase of a carrier signal of the positioning reference signal at a reference time of transmission of the positioning reference signal; or
  means for transmitting, to the second device, a third carrier phase indication indicating a second measured carrier phase of the positioning reference signal such that one of the first measured carrier phase and the second measured carrier phase includes the reference carrier phase of the positioning reference signal and another one of the first measured carrier phase and the second measured carrier phase excludes a phase value corresponding to the reference carrier phase of the positioning reference signal.

* * * * *